(12) United States Patent
Zhang et al.

(10) Patent No.: US 11,328,450 B2
(45) Date of Patent: May 10, 2022

(54) POINT CLOUD ENCODING METHOD, POINT CLOUD DECODING METHOD, ENCODER, AND DECODER

(71) Applicant: Huawei Technologies Co., Ltd., Shenzhen (CN)

(72) Inventors: Dejun Zhang, Shenzhen (CN); Bo Liu, Beijing (CN); Vladyslav Zakharchenko, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/136,915

(22) Filed: Dec. 29, 2020

(65) Prior Publication Data

US 2021/0118188 A1 Apr. 22, 2021

Related U.S. Application Data

(63) Continuation of application No. PCT/CN2019/093392, filed on Jun. 27, 2019.

(30) Foreign Application Priority Data

Jun. 30, 2018 (CN) .......................... 201810706459.1

(51) Int. Cl.
*H04N 19/119* (2014.01)
*G06T 9/00* (2006.01)
(Continued)

(52) U.S. Cl.
CPC ............. *G06T 9/00* (2013.01); *H04N 19/119* (2014.11); *H04N 19/147* (2014.11); *H04N 19/184* (2014.11); *H04N 19/70* (2014.11)

(58) Field of Classification Search
CPC ............................. H04N 19/597; G06T 11/00
See application file for complete search history.

(56) References Cited

U.S. PATENT DOCUMENTS 7,689,051 B2 3/2010 Mukerjee
2009/0040225 A1 2/2009 Wang et al.
(Continued)

FOREIGN PATENT DOCUMENTS

CN 101350016 A 1/2009
CN 102368280 A 3/2012
(Continued)

OTHER PUBLICATIONS

Golla, T., et al., "Real-time Point Cloud Compression," 2015 IEEE/RSJ International Conference on Intelligent Robots and Systems (IROS), Congress Center Hamburg, Sep. 28-Oct. 2, 2015. Hamburg, Germany, 6 pages.
(Continued)

*Primary Examiner* — Jerry T Jean Baptiste
(74) *Attorney, Agent, or Firm* — Conley Rose, P.C.

(57) ABSTRACT

A point cloud coding method includes obtaining description information of a bounding box size of a to-be-encoded point cloud and a normal axis of a to-be-encoded patch in the to-be-encoded point cloud, where the description information of the bounding box size of the to-be-encoded point cloud and the normal axis of the to-be-encoded patch are used to determine a tangent axis of the to-be-encoded patch and a bitangent axis of the to-be-encoded patch, and encoding a syntax element into a bitstream, where the syntax element includes an index of the normal axis of the to-be-encoded patch and information for indicating the description information of the bounding box size of the to-be-encoded point cloud, and the syntax element is used to indicate the tangent axis of the to-be-encoded patch and the bitangent axis of the to-be-encoded patch.

24 Claims, 10 Drawing Sheets

(51) Int. Cl.
*H04N 19/147* (2014.01)
*H04N 19/184* (2014.01)
*H04N 19/70* (2014.01)

(56) References Cited

U.S. PATENT DOCUMENTS

| | | |
|---|---|---|
| 2017/0046589 A1 | 2/2017 | Poelman et al. |
| 2019/0197739 A1* | 6/2019 | Sinharoy .................. G06T 9/00 |
| 2019/0355152 A1 | 11/2019 | Li et al. |
| 2020/0359035 A1 | 11/2020 | Chevet et al. |
| 2021/0065445 A1* | 3/2021 | Kuma .................... G06T 15/08 |
| 2021/0112277 A1 | 4/2021 | Ricard et al. |
| 2021/0250600 A1 | 8/2021 | Kuma et al. |

FOREIGN PATENT DOCUMENTS

| | | |
|---|---|---|
| CN | 104183021 A | 12/2014 |
| CN | 105469404 A | 4/2016 |
| CN | 104392476 B | 7/2017 |
| CN | 107403456 A | 11/2017 |
| CN | 107633539 A | 1/2018 |
| JP | 2021511712 A | 5/2021 |
| JP | 2021518681 A | 8/2021 |
| JP | 2021519533 A | 8/2021 |
| WO | 2006004667 A2 | 1/2006 |
| WO | 2017209961 A1 | 12/2017 |
| WO | 2018060347 A1 | 4/2018 |
| WO | 2018060358 A1 | 4/2018 |
| WO | 2019142665 A1 | 7/2019 |
| WO | 2019198521 A1 | 10/2019 |
| WO | 2019199726 A1 | 10/2019 |

OTHER PUBLICATIONS

Ochotta, T., et al., "Image-Based Surface Compression," The Eurographics Association and Blackwell, Sep. 20, 2008, 15 pages.

Huawei Technologies,["PCC] Patch projection optimization for TMC2," MPEG2018/m43616, Jul. 2018, 4 pages.

Nokia Technologies, "Nokia's response to CfP for Point Cloud Compression (Category 2)," MPEG2017/M41779, Oct. 2017, 22 pages.

J. Smith et al, "Progressive Encoding and Compression of Surfaces Generated from Point Cloud Data," Computers & Graphics 36, 2012, 8 pages.

* cited by examiner

POINT CLOUD ENCODING METHOD, POINT CLOUD DECODING METHOD, ENCODER, AND DECODER

CROSS-REFERENCE TO RELATED APPLICATIONS

This application is a continuation of International Patent Application No. PCT/CN2019/093392 filed on Jun. 27, 2019, which claims priority to Chinese Patent Application No. 201810706459.1 filed on Jun. 30, 2018. The disclosures of the aforementioned applications are hereby incorporated by reference in their entireties.

TECHNICAL FIELD

This application relates to the field of encoding and decoding technologies, and in particular, to a point cloud encoding method, a point cloud decoding method, an encoder, and a decoder.

BACKGROUND

With continuous development of three-dimensional sensor (for example, a three-dimensional scanner) technologies, point cloud data collection is more convenient, and collected point cloud data has a larger scale. Therefore, how to effectively encode and decode point cloud data becomes an urgent problem to be resolved.

SUMMARY

Embodiments of this application provide a point cloud encoding method, a point cloud decoding method, an encoder, and a decoder, to help improve point cloud encoding and decoding performance.

According to a first aspect, an embodiment of this application provides a point cloud encoding method, including obtaining description information of a bounding box size of a to-be-encoded point cloud and a normal axis of a to-be-encoded patch in the to-be-encoded point cloud, where the description information of the bounding box size of the to-be-encoded point cloud and the normal axis of the to-be-encoded patch are used to determine a tangent axis of the to-be-encoded patch and a bitangent axis of the to-be-encoded patch, and encoding a syntax element into a bitstream, where the syntax element includes an index of the normal axis of the to-be-encoded patch and information used to indicate the description information of the bounding box size of the to-be-encoded point cloud, and the syntax element is used to indicate the tangent axis of the to-be-encoded patch and the bitangent axis of the to-be-encoded patch. In an example, the method may be performed by an encoder. The to-be-encoded point cloud may be any frame of point cloud to be encoded, and the to-be-encoded patch may be any patch in the to-be-encoded point cloud.

A bounding box of a point cloud refers to a minimum cuboid surrounding the point cloud.

A bounding box size of the point cloud may also be referred to as side lengths of the bounding box of the point cloud, a three-dimensional space size of the bounding box of the point cloud, or a geometric space size of the bounding box of the point cloud, and may be represented by using lengths of sides, of the bounding box of the point cloud, on three coordinate axes in a reference coordinate system (for example, a world coordinate system).

Description information of the bounding box size of the point cloud is information used to describe the bounding box size of the point cloud. For example, the description information of the bounding box size of the point cloud may include a size relationship among the side lengths of the bounding box of the point cloud, a coordinate axis on which a longest side of the bounding box of the point cloud is located, or the like.

Optionally, information used to indicate the description information of the bounding box size of the point cloud may include size information of the bounding box of the point cloud, an index of the coordinate axis on which the longest side of the bounding box of the point cloud is located, an index of the size relationship among the side lengths of the bounding box of the point cloud, or the like. It should be noted that, if the information used to indicate the description information of the bounding box size of the point cloud is the size information of the bounding box of the point cloud, correspondingly, the description information of the bounding box size of the point cloud may be the size relationship among the side lengths of the bounding box of the point cloud, the coordinate axis on which the longest side of the bounding box of the point cloud is located, or the like. In other words, regardless of an encoder side or a decoder side, the size relationship among the side lengths of the bounding box of the point cloud, the coordinate axis on which the longest side of the bounding box of the point cloud is located, or the like may be obtained based on the size information of the bounding box of the point cloud.

When the description information of the bounding box size of the point cloud includes the size relationship among the side lengths of the bounding box of the point cloud, the information used to indicate the description information of the bounding box size of the point cloud may include the size information of the bounding box of the point cloud or the index of the size relationship among the side lengths of the bounding box of the point cloud.

When the description information of the bounding box size of the point cloud includes the coordinate axis on which the longest side of the bounding box of the point cloud is located, the information used to indicate the description information of the bounding box size of the point cloud may include the size information of the bounding box of the point cloud or the index of the coordinate axis on which the longest side of the bounding box of the point cloud is located.

The index of the normal axis of to-be-encoded patch is patch level (or referred to as patch granularity)-based information. The information used to indicate the description information of the bounding box size of the to-be-encoded point cloud is frame level (or referred to as frame granularity)-based information. A sequence of encoding the foregoing two pieces of information into the bitstream is not limited in this embodiment of this application, and syntax elements at different levels may be separately encoded into the bitstream. For example, frame level (such as point cloud level)-based information is encoded into the bitstream, and patch level-based information is encoded into the bitstream. In other words, the two pieces of information may be encoded into the bitstream at different times.

The description information of the bounding box size of the point cloud may reflect a posture of the point cloud in three-dimensional space, so as to indirectly reflect postures of most patches in the point cloud. In an example, the posture of the point cloud in the three-dimensional space may be represented by information about whether the point cloud is vertical or horizontal in the three-dimensional space. For example, a point cloud shown in FIG. 6A is vertical, and a point cloud shown in FIG. 8A is horizontal. Based on this, it may be considered that most patches in the point cloud shown in FIG. 6A are vertical, and most patches in the point cloud shown in FIG. 8A are horizontal. In addition, when patches in a same posture are mapped to different two-dimensional coordinate systems, postures of projected pictures are different (as shown in FIG. 11A through FIG. 11C). Therefore, determining a tangent axis and a bitangent axis of a to-be-encoded patch in the point cloud based on the description information of the bounding box size of the point cloud and a normal axis of the to-be-encoded patch helps adjust a posture of a projected picture obtained by projecting the patch onto a two-dimensional plane, so that projected pictures of patches are closely arranged in an occupancy map of the point cloud, that is, there are a relatively small quantity of empty pixels in the occupancy map of the point cloud. This facilitates picture/video-based encoding performed on a depth map and a texture map that are determined based on the occupancy map of the point cloud. In other words, point cloud encoding performance can be improved, so as to help improve point cloud decoding performance. For example, when the tangent axis and the bitangent axis of the patch are determined according to the method provided in this embodiment of this application, a posture of a projected picture in the rectangular box in FIG. 8B can be set to vertical. In this way, when the encoder performs packing to generate the occupancy map of the point cloud, the projected picture may be vertical, so that the projected pictures of the patches in the point cloud can be closely arranged in the occupancy map of the point cloud.

In a possible design, the method may further include determining the tangent axis of the to-be-encoded patch and the bitangent axis of the to-be-encoded patch based on the description information of the bounding box size of the to-be-encoded point cloud and the normal axis of the to-be-encoded patch.

In a possible design, the determining the tangent axis of the to-be-encoded patch and the bitangent axis of the to-be-encoded patch based on the description information of the bounding box size of the to-be-encoded point cloud and the normal axis of the to-be-encoded patch may include determining the tangent axis of the to-be-encoded patch and the bitangent axis of the to-be-encoded patch based on the description information of the bounding box size of the to-be-encoded point cloud and the normal axis of the to-be-encoded patch by searching a mapping relationship table, where the mapping relationship table includes a mapping relationship among a plurality of types of description information of bounding box sizes of point clouds, a plurality of types of normal axes of a patch, a plurality of types of tangent axes of the patch, and a plurality of types of bitangent axes of the patch.

In a possible design, the determining the tangent axis of the to-be-encoded patch and the bitangent axis of the to-be-encoded patch based on the description information of the bounding box size of the to-be-encoded point cloud and the normal axis of the to-be-encoded patch may include determining, based on a mapping relationship between a plurality of types of description information of bounding box sizes of point clouds and a plurality of tangent mode sets, a target tangent mode set corresponding to the description information of the bounding box size of the to-be-encoded point cloud, where each tangent mode set includes at least two tangent modes, and each tangent mode includes one tangent axis and one bitangent axis, and determining, based on a mapping relationship between a plurality of types of normal axes of a patch and a plurality of tangent modes in the target tangent mode set, a target tangent mode corresponding to the normal axis of the to-be-encoded patch, where a tangent axis included in the determined target tangent mode is the tangent axis of the to-be-encoded patch, and a bitangent axis included in the determined target tangent mode is the bitangent axis of the to-be-encoded patch. For example, the mapping relationship may be predefined, for example, predefined according to a protocol, and may be specifically, by way of example instead of limitation, stored in one or more tables. In this case, this possible design may be implemented through table searching.

In a possible design, the determining the tangent axis of the to-be-encoded patch and the bitangent axis of the to-be-encoded patch based on the description information of the bounding box size of the to-be-encoded point cloud and the normal axis of the to-be-encoded patch may include determining, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-encoded point cloud and the normal axis of the to-be-encoded patch, where the determined target tangent axis is the tangent axis of the to-be-encoded patch, and the determined target bitangent axis is the bitangent axis of the to-be-encoded patch. For example, the mapping relationship may be predefined, for example, predefined according to a protocol, and may be specifically, by way of example instead of limitation, stored in one or more tables. In this case, this possible design may be implemented through table searching.

In a possible design, if the description information of the bounding box size of the to-be-encoded point cloud includes the size relationship among the side lengths of the bounding box of the to-be-encoded point cloud, when the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the bitangent axis of the to-be-encoded patch (in this case, a coordinate axis that is perpendicular to both the normal axis and the bitangent axis of the to-be-encoded patch is the tangent axis of the to-be-encoded patch), or when the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the bitangent axis of the to-be-encoded patch, and a coordinate axis on which a shortest side of the bounding box of the to-be-encoded point cloud is located is the tangent axis of the to-be-encoded patch (this is marked as a solution A1). Alternatively, when the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the tangent axis of the to-be-encoded patch (in this case, a coordinate axis that is perpendicular to both the normal axis and the tangent axis of the to-be-encoded patch is the bitangent axis of the to-be-encoded patch), or when the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the tangent axis of the to-be-encoded patch, and a coordinate axis on which a shortest side of the bounding box of the to-be-encoded point cloud is located is the bitangent axis of the to-be-encoded patch (this is marked as a solution A2). This helps ensure (or ensures as much as possible) that most of projected pictures obtained by projecting all patches in the to-be-encoded point cloud onto a two-dimensional plane are distributed in a same direction, so that an occupancy map, of the to-be-encoded point cloud, generated by packing these patches has a relatively small size (that is, the patches are arranged more closely), thereby reducing bit overheads of bitstream transmission. That the projected pictures are distributed in a same direction means that long sides (that is, longer sides in widths and heights) of smallest rectangles surrounding the projected pictures are distributed in a same direction. For example, the long sides of these smallest rectangles are all parallel to one coordinate axis in a reference coordinate system (for example, a world coordinate system) in three-dimensional space.

In a possible design, if the description information of the bounding box size of the to-be-encoded point cloud includes the coordinate axis on which the longest side of the bounding box of the to-be-encoded point cloud is located, when the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the bitangent axis of the to-be-encoded patch (in this case, a coordinate axis that is perpendicular to both the normal axis and the bitangent axis of the to-be-encoded patch is the tangent axis of the to-be-encoded patch), or when the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located and a coordinate axis on which a shortest side of the bounding box of the to-be-encoded point cloud is located is the bitangent axis of the to-be-encoded patch, and the other is the tangent axis of the to-be-encoded patch (this is marked as a solution B1). Alternatively, when the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the tangent axis of the to-be-encoded patch (in this case, a coordinate axis that is perpendicular to both the normal axis and the tangent axis of the to-be-encoded patch is the bitangent axis of the to-be-encoded patch), or when the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located and a coordinate axis on which a shortest side of the bounding box of the to-be-encoded point cloud is located is the tangent axis of the to-be-encoded patch, and the other is the bitangent axis of the to-be-encoded patch (this is marked as a solution B2). This helps ensure (or ensures as much as possible) that most of projected pictures obtained by projecting all patches in the to-be-encoded point cloud onto a two-dimensional plane are distributed in a same direction, so that an occupancy map, of the to-be-encoded point cloud, generated by packing these patches has a relatively small size, thereby reducing bit overheads of bitstream transmission.

In a possible design, the determining the tangent axis of the to-be-encoded patch and the bitangent axis of the to-be-encoded patch based on the description information of the bounding box size of the to-be-encoded point cloud and the normal axis of the to-be-encoded patch may include determining the tangent axis of the to-be-encoded patch and the bitangent axis of the to-be-encoded patch according to a projection rule (which is referred to as a projection rule for encoding the to-be-encoded point cloud below) based on the description information of the bounding box size of the to-be-encoded point cloud and the normal axis of the to-be-encoded patch, where the projection rule refers to distribution, on a two-dimensional plane, of a projected picture obtained by projecting a patch in the to-be-encoded point cloud onto the two-dimensional plane. For example, the projection rule may indicate horizontal projection or vertical projection.

For example, the two-dimensional plane is a plane on which a tangent axis of a patch and a bitangent axis of the patch are located. The patch herein is a generalized patch, and includes the to-be-encoded patch. In an example, a horizontal axis of the two-dimensional plane is the tangent axis of the patch, and a vertical axis is the bitangent axis of the patch. Optionally, a horizontal axis of the two-dimensional plane is the bitangent axis of the patch, and a vertical axis is the tangent axis of the patch. It should be noted that, for ease of description, unless otherwise specified, an example in which "a horizontal axis of a two-dimensional plane is a tangent axis of a patch and a vertical axis is a bitangent axis of the patch" is used for description in all technical solutions described in specific implementations of the embodiments of this application.

For example, the tangent axis of the to-be-encoded patch and the bitangent axis of the to-be-encoded patch are used to project the to-be-encoded patch from a three-dimensional coordinate system to a two-dimensional coordinate system.

In a possible design, the projection rule for projecting the to-be-encoded point cloud may be a default projection rule, or a preset projection rule (or referred to as a predefined projection rule, which may be, for example, predefined according to a protocol between an encoder side and a decoder side). Alternatively, the projection rule for projecting the to-be-encoded point cloud may be a projection rule indicated by the syntax element obtained from the bitstream through parsing.

In a possible design, the syntax element may further include information used to indicate the projection rule. The information used to indicate the projection rule is frame level-based information.

In a possible design, the method may further include determining, according to a rate-distortion cost criterion, the projection rule for projecting the to-be-encoded point cloud. Specifically, a corresponding mapping relationship among "description information of a bounding box size of a point cloud, a normal axis of a patch, a tangent axis of the patch, and a bitangent axis of the patch" is selected based on each of candidate projection rules, so that the tangent axis and the bitangent axis of the to-be-encoded patch are pre-determined based on the mapping relationship, and then bit overheads of bitstream transmission of the to-be-encoded point cloud are pre-determined. Subsequently, a candidate projection rule corresponding to lowest transmission bit overheads (or a candidate projection rule corresponding to transmission bit overheads lower than or equal to preset overheads) is selected as the projection rule for projecting the to-be-encoded point cloud.

In a possible design, it is assumed that the description information of the bounding box size of the to-be-encoded point cloud includes the size relationship among the side lengths of the bounding box of the to-be-encoded point cloud. In this case, if the projection rule indicates vertical projection, a specific solution may be the foregoing solution A1. Alternatively, if the projection rule indicates horizontal projection, a specific solution may be the foregoing solution A2. In this possible design, an example in which "a horizontal axis of a two-dimensional plane is a tangent axis of a patch and a vertical axis is a bitangent axis of the patch" is used for description.

Alternatively, in a case in which a horizontal axis of a two-dimensional plane is a bitangent axis of a patch and a vertical axis is a tangent axis of the patch, if the description information of the bounding box size of the to-be-encoded point cloud includes the size relationship among the side lengths of the bounding box of the to-be-encoded point cloud, and the projection rule indicates vertical projection, a specific solution may be the foregoing solution A2. Alternatively, if the projection rule indicates horizontal projection, a specific solution may be the foregoing solution A1.

In a possible design, it is assumed that the description information of the bounding box size of the to-be-encoded point cloud includes the coordinate axis on which the longest side of the bounding box of the to-be-encoded point cloud is located. In this case, if the projection rule indicates vertical projection, a specific solution may be the foregoing solution B1. Alternatively, if the projection rule indicates horizontal projection, a specific solution may be the foregoing solution B2. In this possible design, an example in which "a horizontal axis of a two-dimensional plane is a tangent axis of a patch and a vertical axis is a bitangent axis of the patch" is used for description.

Alternatively, in a case in which a horizontal axis of a two-dimensional plane is a bitangent axis of a patch and a vertical axis is a tangent axis of the patch, if the description information of the bounding box size of the to-be-encoded point cloud includes the coordinate axis on which the longest side of the bounding box of the to-be-encoded point cloud is located, and the projection rule indicates vertical projection, a specific solution may be the foregoing solution B2. Alternatively, if the projection rule indicates horizontal projection, a specific solution may be the foregoing solution B1.

According to a second aspect, an embodiment of this application provides a point cloud decoding method, including parsing a bitstream to obtain a syntax element, where the syntax element includes an index of a normal axis of a to-be-decoded patch in a to-be-decoded point cloud and information used to indicate description information of a bounding box size of the to-be-decoded point cloud, determining a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing, and reconstructing geometry information of the to-be-decoded point cloud based on tangent axes and bitangent axes of one or more patches in the to-be-decoded point cloud, where the one or more patches include the to-be-decoded patch. The method may be performed by a point cloud decoder. Geometry information of a point cloud refers to coordinates of a point in the point cloud (for example, each point in the point cloud) in three-dimensional space.

In a possible design, the information used to indicate the description information of the bounding box size of the to-be-decoded point cloud includes size information of a bounding box of the to-be-decoded point cloud, or an index of a coordinate axis on which a longest side of a bounding box of the to-be-decoded point cloud is located, or an index of a size relationship among side lengths of a bounding box of the to-be-decoded point cloud.

The description information of the bounding box size of the to-be-decoded point cloud may include the size relationship among the side lengths of the bounding box of the to-be-decoded point cloud, or the coordinate axis on which the longest side of the bounding box of the to-be-decoded point cloud is located.

For example, when the description information of the bounding box size of the to-be-decoded point cloud includes the size relationship among the side lengths of the bounding box of the to-be-decoded point cloud, if the information used to indicate the description information of the bounding box size of the to-be-decoded point cloud includes the size information of the bounding box of the to-be-decoded point cloud, the method may further include obtaining the size relationship among the side lengths of the bounding box of the to-be-decoded point cloud based on the size information of the bounding box of the to-be-decoded point cloud. Then, optionally, the tangent axis and the bitangent axis of the to-be-decoded patch may be determined according to a possible design provided below.

For example, when the description information of the bounding box size of the to-be-decoded point cloud includes the coordinate axis on which the longest side of the bounding box of the to-be-decoded point cloud is located, if the information used to indicate the description information of the bounding box size of the to-be-decoded point cloud includes the size information of the bounding box of the to-be-decoded point cloud, the method may further include obtaining, based on the size information of the bounding box of the to-be-decoded point cloud, the coordinate axis on which the longest side of the bounding box of the to-be-decoded point cloud is located. Then, optionally, the tangent axis and the bitangent axis of the to-be-decoded patch may be determined according to a possible design provided below.

In a possible design, the determining a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing may include determining, based on a mapping relationship between a plurality of types of description information of bounding box sizes of point clouds and a plurality of tangent mode sets, a target tangent mode set corresponding to the description information of the bounding box size of the to-be-decoded point cloud, where each tangent mode set includes at least two tangent modes, and each tangent mode includes one tangent axis and one bitangent axis, and determining, based on a mapping relationship between a plurality of types of normal axes of a patch and a plurality of tangent modes in the target tangent mode set, a target tangent mode corresponding to the normal axis of the to-be-decoded patch, where a tangent axis included in the determined target tangent mode is the tangent axis of the to-be-decoded patch, and a bitangent axis included in the determined target tangent mode is the bitangent axis of the to-be-decoded patch.

In a possible design, the determining a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing may include determining, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-decoded point cloud and the normal axis of the to-be-decoded patch, where the determined target tangent axis is the tangent axis of the to-be-decoded patch, and the determined target bitangent axis is the bitangent axis of the to-be-decoded patch.

In a possible design, if the description information of the bounding box size of the to-be-decoded point cloud includes the size relationship among the side lengths of the bounding box of the to-be-decoded point cloud, when the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the bitangent axis of the to-be-decoded patch, or when the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the bitangent axis of the to-be-decoded patch, and a coordinate axis on which a shortest side of the bounding box of the to-be-decoded point cloud is located is the tangent axis of the to-be-decoded patch (this is marked as a solution C1). Alternatively, when the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the tangent axis of the to-be-decoded patch, or when the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the tangent axis of the to-be-decoded patch, and a coordinate axis on which a shortest side of the bounding box of the to-be-decoded point cloud is located is the bitangent axis of the to-be-decoded patch (this is marked as a solution C2).

In a possible design, if the description information of the bounding box size of the to-be-decoded point cloud includes the coordinate axis on which the longest side of the bounding box of the to-be-decoded point cloud is located, when the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the bitangent axis of the to-be-decoded patch, or when the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located and a coordinate axis on which a shortest side of the bounding box of the to-be-decoded point cloud is located is the bitangent axis of the to-be-decoded patch, and the other is the tangent axis of the to-be-decoded patch (this is marked as a solution D1). Alternatively, when the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the tangent axis of the to-be-decoded patch, or when the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located and a coordinate axis on which a shortest side of the bounding box of the to-be-decoded point cloud is located is the tangent axis of the to-be-decoded patch, and the other is the bitangent axis of the to-be-decoded patch (this is marked as a solution D2).

In a possible design, the determining a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing may include determining the tangent axis of the to-be-decoded patch and the bitangent axis of the to-be-decoded patch according to a projection rule (which is referred to as a projection rule for projecting the to-be-decoded point cloud below) based on the index of the normal axis of the to-be-decoded patch and the information used to indicate the description information of the bounding box size of the to-be-decoded point cloud that are obtained through parsing, where the projection rule refers to distribution, on a two-dimensional plane, of a projected picture obtained by projecting a patch in the to-be-decoded point cloud onto the two-dimensional plane. For example, the projection rule may indicate horizontal projection or vertical projection.

In a possible design, the projection rule for projecting the to-be-decoded point cloud is preset.

In a possible design, the syntax element further includes information used to indicate the projection rule for projecting the to-be-decoded point cloud, and correspondingly, the projection rule is a projection rule indicated by the syntax element obtained from the bitstream through parsing.

In a possible design, the description information of the bounding box size of the to-be-decoded point cloud includes the size relationship among the side lengths of the bounding box of the to-be-decoded point cloud. If the projection rule indicates vertical projection, a specific solution may be the foregoing solution C1. Alternatively, if the projection rule indicates horizontal projection, a specific solution may be the foregoing solution C2.

In a possible design, the description information of the bounding box size of the to-be-decoded point cloud includes the coordinate axis on which the longest side of the bounding box of the to-be-decoded point cloud is located. If the projection rule indicates vertical projection, a specific solution may be the foregoing solution D1. Alternatively, if the projection rule indicates horizontal projection, a specific solution may be the foregoing solution D2.

The technical solution provided in any one of the second aspect and the possible designs of the second aspect corresponds to the first aspect or the corresponding point cloud encoding method provided in the first aspect. Therefore, for beneficial effects that can be achieved and explanations of related content, refer to the foregoing descriptions.

According to a third aspect, an embodiment of this application provides a point cloud encoding method, including obtaining description information of a bounding box size of a to-be-encoded point cloud group and a normal axis of a to-be-encoded patch in the to-be-encoded point cloud group, where the to-be-encoded point cloud group includes at least two frames of point clouds, and the description information of the bounding box size of the to-be-encoded point cloud group and the normal axis of the to-be-encoded patch are used to determine a tangent axis of the to-be-encoded patch and a bitangent axis of the to-be-encoded patch, and encoding a syntax element into a bitstream, where the syntax element includes an index of the normal axis of the to-be-encoded patch and information used to indicate the description information of the bounding box size of the to-be-encoded point cloud group, and the syntax element is used to indicate the tangent axis of the to-be-encoded patch and the bitangent axis of the to-be-encoded patch. A difference between this technical solution and the technical solution in the first aspect lies in that point cloud encoding is performed based on a point cloud group in this technical solution. Therefore, in addition to the beneficial effects that can be achieved according to the technical solution provided in the first aspect, encoding complexity can be further reduced, and bit overheads of bitstream transmission can be further reduced.

In a possible design, the method further includes determining the tangent axis of the to-be-encoded patch and the bitangent axis of the to-be-encoded patch based on the description information of the bounding box size of the to-be-encoded point cloud group and the normal axis of the to-be-encoded patch.

In a possible design, the obtaining description information of a bounding box size of a to-be-encoded point cloud group may include using description information of a bounding box size of one frame of point cloud in the to-be-encoded point cloud group as the description information of the bounding box size of the to-be-encoded point cloud group, or using description information with a highest appearance frequency in description information of bounding box sizes of some or all point clouds in the to-be-encoded point cloud group as the description information of the bounding box size of the to-be-encoded point cloud group.

In a possible design, the description information of the bounding box size of the to-be-encoded point cloud group may include a coordinate axis on which a longest side of a bounding box of the to-be-encoded point cloud group is located or a size relationship among side lengths of a bounding box of the to-be-encoded point cloud group.

In a possible design, the information used to indicate the description information of the bounding box size of the to-be-encoded point cloud group may include size information of a bounding box of one frame of point cloud in the to-be-encoded point cloud group, or size information with a highest appearance frequency in bounding box sizes of some or all point clouds in the to-be-encoded point cloud group. It may be understood that, in this possible design, the description information of the bounding box size of the to-be-encoded point cloud group may be the coordinate axis on which the longest side of the bounding box of the to-be-encoded point cloud group is located or the size relationship among the side lengths of the bounding box of the to-be-encoded point cloud group.

In a possible design, the information used to indicate the description information of the bounding box size of the to-be-encoded point cloud group may include an index of a coordinate axis on which a longest side of a bounding box of one frame of point cloud in the to-be-encoded point cloud group is located, or an index of a coordinate axis with a highest appearance frequency in coordinate axes on which longest sides of bounding boxes of some or all point clouds in the to-be-encoded point cloud group are located. It may be understood that, in this possible design, the description information of the bounding box size of the to-be-encoded point cloud group may be the coordinate axis on which the longest side of the bounding box of the to-be-encoded point cloud group is located.

In a possible design, the information used to indicate the description information of the bounding box size of the to-be-encoded point cloud group may include an index of a size relationship among side lengths of a bounding box of one frame of point cloud in the to-be-encoded point cloud group, or an index of a size relationship with a highest appearance frequency in size relationships among side lengths of bounding boxes of some or all point clouds in the to-be-encoded point cloud group. It may be understood that, in this possible design, the description information of the bounding box size of the to-be-encoded point cloud group may be the size relationship among the side lengths of the bounding box of the to-be-encoded point cloud group.

Optionally, all possible designs obtained by replacing the frame level-based information in any possible design provided in the first aspect with group of frames (GOF) level-based information are applicable to the third aspect. For example, "bounding box of the point cloud" in any possible design provided in the first aspect is replaced with "bounding box of the point cloud group". For example, "projection rule for projecting the to-be-encoded point cloud" in the possible design provided in the first aspect is replaced with "projection rule for projecting the to-be-encoded point cloud group". Details are not described herein one by one.

According to a fourth aspect, an embodiment of this application provides a point cloud decoding method, including parsing a bitstream to obtain a syntax element, where the syntax element includes an index of a normal axis of a to-be-decoded patch in a to-be-decoded point cloud group and information used to indicate description information of a bounding box size of the to-be-decoded point cloud group, and the point cloud group includes at least two frames of point clouds, determining a tangent axis of the to-be-decoded patch and a bitangent axis of the to-be-decoded patch based on the index of the normal axis of the to-be-decoded patch and the information used to indicate the description information of the bounding box size of the to-be-decoded point cloud group that are obtained through parsing, and reconstructing geometry information of a to-be-decoded point cloud in the to-be-decoded point cloud group based on tangent axes and bitangent axes of one or more patches in the to-be-decoded point cloud, where the one or more patches include the to-be-decoded patch.

In a possible design, the description information of the bounding box size of the to-be-decoded point cloud group may include a coordinate axis on which a longest side of a bounding box of the to-be-decoded point cloud group is located or a size relationship among side lengths of a bounding box of the to-be-decoded point cloud group.

In a possible design, the information used to indicate the description information of the bounding box size of the to-be-decoded point cloud group may include size information of a bounding box of one frame of point cloud in the to-be-decoded point cloud group, or size information with a highest appearance frequency in bounding box sizes of some or all point clouds in the to-be-decoded point cloud group.

In a possible design, the information used to indicate the description information of the bounding box size of the to-be-decoded point cloud group may include an index of a coordinate axis on which a longest side of a bounding box of one frame of point cloud in the to-be-decoded point cloud group is located, or an index of a coordinate axis with a highest appearance frequency in coordinate axes on which longest sides of bounding boxes of some or all point clouds in the to-be-decoded point cloud group are located.

In a possible design, the information used to indicate the description information of the bounding box size of the to-be-decoded point cloud group may include an index of a size relationship among side lengths of a bounding box of one frame of point cloud in the to-be-decoded point cloud group, or an index of a size relationship with a highest appearance frequency in size relationships among side lengths of bounding boxes of some or all point clouds in the to-be-decoded point cloud group.

Optionally, all possible designs obtained by replacing the frame level-based information in any possible design provided in the second aspect with GOF level-based information are applicable to the fourth aspect. For example, "bounding box of the point cloud" in any possible design provided in the second aspect is replaced with "bounding box of the point cloud group". For example, "projection rule for projecting the to-be-decoded point cloud" in the possible design provided in the second aspect is replaced with "projection rule for projecting the to-be-decoded point cloud group". Details are not described herein one by one.

The technical solution provided in any one of the fourth aspect and the possible designs of the fourth aspect corresponds to the third aspect or the corresponding point cloud encoding method provided in the third aspect. Therefore, for beneficial effects that can be achieved and explanations of related content, refer to the third aspect.

According to a fifth aspect, an embodiment of this application provides a method for determining a tangent axis and a bitangent axis of a patch. The method includes obtaining description information of a bounding box size of a to-be-processed point cloud and a normal axis of a to-be-processed patch in the to-be-processed point cloud, and determining a tangent axis of the to-be-processed patch and a bitangent axis of the to-be-processed patch based on the description information of the bounding box size of the to-be-processed point cloud and the normal axis of the to-be-processed patch.

In an example, the method may be performed by an encoder. In this case, the to-be-processed point cloud is specifically a to-be-encoded point cloud, and the to-be-processed patch is specifically a to-be-encoded patch. In this case, for explanations of related terms in the technical solution provided in the fifth aspect and specific implementations of related steps, refer to any possible design in the first aspect.

In an example, the method may be performed by a decoder. In this case, the to-be-processed point cloud is specifically a to-be-decoded point cloud, and the to-be-processed patch is specifically a to-be-decoded patch. In this case, for explanations of related terms in the technical solution provided in the fifth aspect and specific implementations of related steps, refer to any possible design in the second aspect.

According to a sixth aspect, an embodiment of this application provides an encoder, including a patch information generation module, configured to obtain description information of a bounding box size of a to-be-encoded point cloud and a normal axis of a to-be-encoded patch in the to-be-encoded point cloud, where the description information of the bounding box size of the to-be-encoded point cloud and the normal axis of the to-be-encoded patch are used to determine a tangent axis of the to-be-encoded patch and a bitangent axis of the to-be-encoded patch, and an auxiliary information encoding module, configured to encode a syntax element into a bitstream, where the syntax element includes an index of the normal axis of the to-be-encoded patch and information used to indicate the description information of the bounding box size of the to-be-encoded point cloud, and the syntax element is used to indicate the tangent axis of the to-be-encoded patch and the bitangent axis of the to-be-encoded patch.

Alternatively, "description information of a bounding box size of a to-be-encoded point cloud" in the sixth aspect may be replaced with "description information of a bounding box size of a to-be-encoded point cloud group", and the point cloud group includes at least two frames of point clouds.

According to a seventh aspect, an embodiment of this application provides a decoder, including an auxiliary information decoding module, configured to parse a bitstream to obtain a syntax element, where the syntax element includes an index of a normal axis of a to-be-decoded patch in a to-be-decoded point cloud and information used to indicate description information of a bounding box size of the to-be-decoded point cloud, and determine a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing, and a point cloud geometry information reconstruction module, configured to reconstruct geometry information of the to-be-decoded point cloud based on tangent axes and bitangent axes of one or more patches in the to-be-decoded point cloud, where the one or more patches include the to-be-decoded patch.

Alternatively, "description information of a bounding box size of a to-be-decoded point cloud" in the seventh aspect may be replaced with "description information of a bounding box size of a to-be-decoded point cloud group", and the point cloud group includes at least two frames of point clouds.

According to an eighth aspect, an embodiment of this application provides a point cloud data encoding device. The device may include a memory and an encoder.

The memory is configured to store point cloud data, and the point cloud data includes one or more frames of point clouds.

The encoder is configured to encode an identifier into a bitstream. The identifier is used to indicate whether to determine a tangent axis and a bitangent axis of a patch (the patch may be a generalized patch, and in this case, the identifier is frame level-based information) in a to-be-encoded point cloud in the one or more frames of point clouds based on description information of a bounding box size of the point cloud, that is, used to indicate whether to encode the patch in the to-be-encoded point cloud according to the point cloud encoding method provided in the first aspect. When the identifier is used to indicate to determine the tangent axis and the bitangent axis of the to-be-encoded patch in the to-be-encoded point cloud based on the description information of the bounding box size of the point cloud, the encoder performs encoding according to any point cloud encoding method provided in the first aspect.

Alternatively, the point cloud data in the eighth aspect includes one or more point cloud groups, and each point cloud group includes one or more frames of point clouds. The encoder is configured to encode an identifier into a bitstream. The identifier is used to indicate whether to determine a tangent axis and a bitangent axis of a patch (the patch may be a generalized patch, and in this case, the identifier is GOF level-based information) in a to-be-encoded point cloud group in the one or more point cloud groups based on description information of a bounding box size of the point cloud group, that is, used to indicate whether to encode the patch in the to-be-encoded point cloud group according to the point cloud encoding method provided in the third aspect. When the identifier is used to indicate to determine the tangent axis and the bitangent axis of the to-be-encoded patch in the to-be-encoded point cloud group based on the description information of the bounding box size of the point cloud group, the encoder performs encoding according to any point cloud encoding method provided in the third aspect.

According to a ninth aspect, an embodiment of this application provides a point cloud data decoding device. The device may include a memory and a decoder.

The memory is configured to store point cloud data in a form of a bitstream, and the point cloud data includes one or more frames of point clouds.

The decoder is configured to decode the bitstream to obtain an identifier. The identifier is used to indicate whether to determine a tangent axis and a bitangent axis of a patch in a to-be-decoded point cloud in the one or more frames of point clouds based on description information of a bounding box size of the point cloud, that is, used to indicate whether to decode the patch in the to-be-decoded point cloud according to the point cloud decoding method provided in the second aspect. When the identifier is used to indicate to determine the tangent axis and the bitangent axis of the to-be-decoded patch in the to-be-decoded point cloud based on the description information of the bounding box size of the point cloud, the decoder performs decoding according to any point cloud decoding method provided in the second aspect.

Alternatively, the point cloud data in the ninth aspect includes one or more point cloud groups, and each point cloud group includes one or more frames of point clouds. The decoder is configured to decode the bitstream to obtain an identifier. The identifier is used to indicate whether to determine a tangent axis and a bitangent axis of a patch (the patch may be a generalized patch, and in this case, the identifier is GOF level-based information) in a to-be-decoded point cloud group in the one or more point cloud groups based on description information of a bounding box size of the point cloud group, that is, used to indicate whether to decode the patch in the to-be-decoded point cloud group according to the point cloud decoding method provided in the fourth aspect. When the identifier is used to indicate to determine the tangent axis and the bitangent axis of the to-be-decoded patch in the to-be-decoded point cloud group based on the description information of the bounding box size of the point cloud group, the decoder performs decoding according to any point cloud decoding method provided in the fourth aspect.

According to a tenth aspect, an embodiment of this application provides an encoding device, including a non-volatile memory and a processor that are coupled to each other, where the processor invokes program code stored in the memory to perform some or all steps of any method in the first aspect or the third aspect.

According to an eleventh aspect, an embodiment of this application provides a decoding device, including a non-volatile memory and a processor that are coupled to each other, where the processor invokes program code stored in the memory to perform some or all steps of any method in the second aspect or the fourth aspect.

According to a twelfth aspect, an embodiment of this application provides an apparatus for determining a tangent axis and a bitangent axis of a patch. The apparatus may be configured to perform any method provided in the fifth aspect. In an example, the apparatus may be a chip. In a possible design, the apparatus may be divided into function modules according to the method provided in the fifth aspect. For example, each function module may be obtained through division based on each corresponding function, or two or more functions may be integrated into one processing module. In a possible design, the apparatus may include a memory and a processor, the memory is configured to store program code, and when the program code is executed by the processor, any method provided in the fifth aspect is performed.

According to a thirteenth aspect, an embodiment of this application provides a processing apparatus, configured to implement functions of the encoder, the decoder, or the apparatus for determining a tangent axis and a bitangent axis of a patch. The processing apparatus includes a processor and an interface. The processing apparatus may be a chip. The processor may be implemented by hardware or software. When being implemented by the hardware, the processor may be a logic circuit, an integrated circuit (IC), or the like. When being implemented by the software, the processor may be a general-purpose processor. When being implemented by reading software code stored in a memory, the memory may be integrated into the processor, or may exist independently outside the processor.

According to a fourteenth aspect, an embodiment of this application provides a computer-readable storage medium. The computer-readable storage medium stores program code, and the program code includes an instruction used to perform some or all steps of any method in the first aspect to the fifth aspect.

According to a fifteenth aspect, an embodiment of this application provides a computer program product. When the computer program product is run on a computer, the computer is enabled to perform some or all steps of any method in the first aspect to the fifth aspect.

It should be understood that the second to the fifteenth aspects are consistent with the technical solution in the first aspect of this application or correspond to the technical solution in the first aspect of this application. Therefore, beneficial effects of the aspects and corresponding possible designs are similar, and details are not described again.

DESCRIPTION OF EMBODIMENTS

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases only A exists, both A and B exist, and only B exists. "A plurality of" means "two or more". In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" are not intended to limit a quantity or an execution sequence, and the terms such as "first" and "second" do not indicate a definite difference. In addition, in the descriptions of this application, descriptions such as "upper", "lower", "left", "right", "front", and "rear" are all provided by using the accompanying drawings as an example.

In the descriptions of this application, descriptions are provided by using an example in which a coordinate system of three-dimensional space is used as a world coordinate system (or referred to as a physical coordinate system), three coordinate axes of the world coordinate system are respectively the x-axis, the y-axis, and the z-axis, and a correspondence between the three coordinate axes and indexes of the three coordinate axes is shown in Table 1. The x-axis is a coordinate axis in a horizontal direction, the y-axis is a coordinate axis in a vertical direction, and the z-axis is a coordinate axis perpendicular to a plane on which the x-axis and the y-axis are located. This is uniformly described herein, and is not described below again.

TABLE 1

| x-axis | y-axis | z-axis |
|--------|--------|--------|
| 0      | 1      | 2      |

Figure 1:
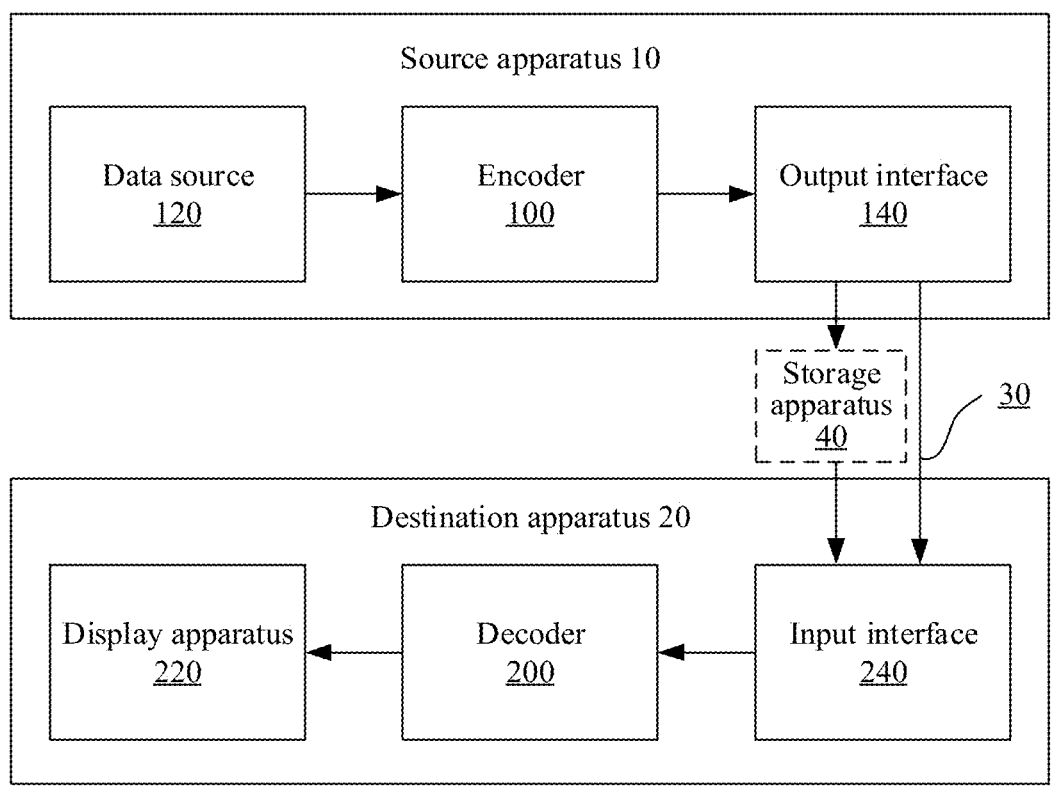
FIG. 1 is a block diagram of an example point cloud coding system that is applicable to an embodiment of this application.

FIG. 1 is a block diagram of an example point cloud coding system 1 that is applicable to an embodiment of this application. In this application, the term "point cloud coding" or "coding" may generally refer to point cloud encoding or point cloud decoding. An encoder 100 in the point cloud coding system 1 may encode a to-be-encoded point cloud according to any point cloud encoding method provided in this application. A decoder 200 in the point cloud coding system 1 may decode a to-be-decoded point cloud according to any point cloud decoding method provided in this application. Specifically, both the point cloud encoding method and the point cloud decoding method may include determining a tangent axis and a bitangent axis of a patch in a point cloud (or a point cloud group) based on description information of a bounding box size of the point cloud (or the point cloud group) and a normal axis of the patch. Based on this, a correspondence among the description information of the bounding box size of the point cloud (or the point cloud group), the normal axis of the patch, the tangent axis of the patch, and the bitangent axis of the patch is properly set, to help improve point cloud encoding and decoding performance. For analysis of related terms and beneficial effects in this solution, refer to the following.

As shown in FIG. 1, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random-access memory (RAM), a read-only memory (ROM), an electrically erasable programmable read-only memory (EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, or similar apparatuses.

The destination apparatus 20 may receive the encoded point cloud data from the source apparatus 10 over a link 30. The link 30 may include one or more media or apparatuses that can move the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded point cloud data may be accessed by an input interface 240 from the storage apparatus 40. The storage apparatus 40 may include any one of a plurality of distributed data storage media or locally accessed data storage media, for example, a hard drive, a BLU-RAY disc, a digital versatile disc (DVD), a compact disc read-only memory (CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. An example file server includes a network server (for example, used for a website), a File Transfer Protocol (FTP) server, a network attached storage (NAS) apparatus, or a local disk drive. The destination apparatus 20 may access the encoded point cloud data through any standard data connection (including an internet connection). The standard data connection may include a radio channel (for example, a WI-FI connection), a wired connection (for example, a digital subscriber line (DSL) or a cable modem), or a combination thereof that is suitable for accessing the encoded point cloud data stored in the file server. Transmission of the encoded point cloud data from the storage apparatus 40 may be streaming transmission, downloading transmission, or a combination thereof.

The point cloud coding system 1 described in FIG. 1 is merely an example, and the technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, is transmitted on a network in a streaming manner, and the like. The point cloud encoding apparatus may encode the data and store the data in the memory, and/or the point cloud decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 1, the source apparatus 10 includes a data source 120, the encoder 100, and the output interface 140. In some examples, the output interface 140 may include a modulator/demodulator (modem) and/or a transmitter. The data source 120 may include a point cloud capture apparatus (for example, a camera), a point cloud archive including previously captured point cloud data, a point cloud feed-in interface configured to receive point cloud data from a point cloud content provider, and/or a computer graphics system configured to generate point cloud data, or a combination of these sources of point cloud data.

The encoder 100 may encode the point cloud data from the data source 120. In some examples, the source apparatus 10 directly sends the encoded point cloud data to the destination apparatus 20 through the output interface 140. In another example, the encoded point cloud data may be alternatively stored in the storage apparatus 40, so that the destination apparatus 20 subsequently accesses the encoded point cloud data for decoding and/or play.

In the example in FIG. 1, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Usually, the display apparatus 220 displays decoded point cloud data. There may be a plurality of types of display apparatuses 220, for example, a liquid-crystal display (LCD), a plasma display, an organic light-emitting diode (OLED) display, or another type of display apparatus.

Although not shown in FIG. 1, in some aspects, the encoder 100 and the decoder 200 may be respectively integrated with an audio encoder and an audio decoder, and may include an appropriate multiplexer-demultiplexer (MUX-DEMUX) unit or other hardware and software, to process encoding of audio and a video in a combined data stream or a separate data stream. In some examples, if appropriate, the MUX-DEMUX unit can comply with an International Telecommunication Union (ITU) H.223 multiplexer protocol or another protocol such as a User Datagram Protocol (UDP).

The encoder 100 and the decoder 200 each may be implemented, for example, as any one of a plurality of circuits one or more microprocessors, a digital signal processor (DSP), an application-specific integrated circuit (ASIC), a field-programmable gate array (FPGA), discrete logic, hardware, or any combination thereof. If this application is implemented partially through software, the apparatus may store, in an appropriate non-volatile computer-readable storage medium, an instruction used for the software, and may use one or more processors to execute the instruction in hardware, to implement the technology in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally referred to as another apparatus that "signals" or "sends" some information to, for example, the decoder 200. The term "signal" or "send" may generally refer to transmission of a syntax element and/or other data used for decoding compressed point cloud data. The transmission may occur in real time or almost in real time. Alternatively, the communication may occur after a period of time. For example, the communication may occur when a syntax element in an encoded bitstream is stored in a computer-readable storage medium during encoding, and the decoding apparatus may then retrieve the syntax element at any time after the syntax element is stored in the medium.

In an example, the encoder 100 may be configured to encode a syntax element related to a current point cloud (or point cloud group) into a bitstream. The syntax element may include information used to indicate a tangent axis and a bitangent axis of a patch in the current point cloud (or point cloud group). The information may include an identifier used to indicate whether to determine the tangent axis and the bitangent axis of the patch in the current point cloud (or point cloud group) based on description information of a bounding box size of the current point cloud (or point cloud group) (that is, an identifier used to indicate whether the decoder 200 determines the tangent axis and the bitangent axis of the patch for the current point cloud (or point cloud group) by using a method provided in this application). Data processing processes of the encoder 100 and the decoder 200 are the same (or correspondingly the same). Therefore, if the identifier is used to indicate to determine the tangent axis and the bitangent axis of the patch in the current point cloud (or point cloud group) based on the description information of the bounding box size of the current point cloud (or point cloud group), when encoding the syntax element related to the current point cloud (or point cloud group) into the bitstream, the encoder 100 may send the bitstream to the decoder 200, and may determine the tangent axis and the bitangent axis of the patch in the current point cloud (or point cloud group) based on the description information of the bounding box size of the current point cloud (or point cloud group).

In an example, the decoder 200 may be configured to parse a bitstream, to obtain a syntax element related to a current point cloud (or point cloud group). The syntax element may include an identifier used to indicate to determine a tangent axis and a bitangent axis of a patch in the current point cloud (or point cloud group) based on description information of a bounding box size of the current point cloud (or point cloud group). In this case, the decoder 200 may determine the tangent axis and the bitangent axis of the patch in the current point cloud (or point cloud group) based on the description information of the bounding box size of the current point cloud (or point cloud group).

It should be noted that during actual implementation, determining of the tangent axis and the bitangent axis of the patch in the current point cloud (or point cloud group) based on the description information of the bounding box size of the current point cloud (or point cloud group) may be predefined (for example, predefined according to a protocol) by the encoder 100 and the decoder 200. In this case, a syntax element (which specifically refers to picture filtering data) sent by the encoder 100 to the decoder 200 may not include the foregoing identifier.

Figure 2:
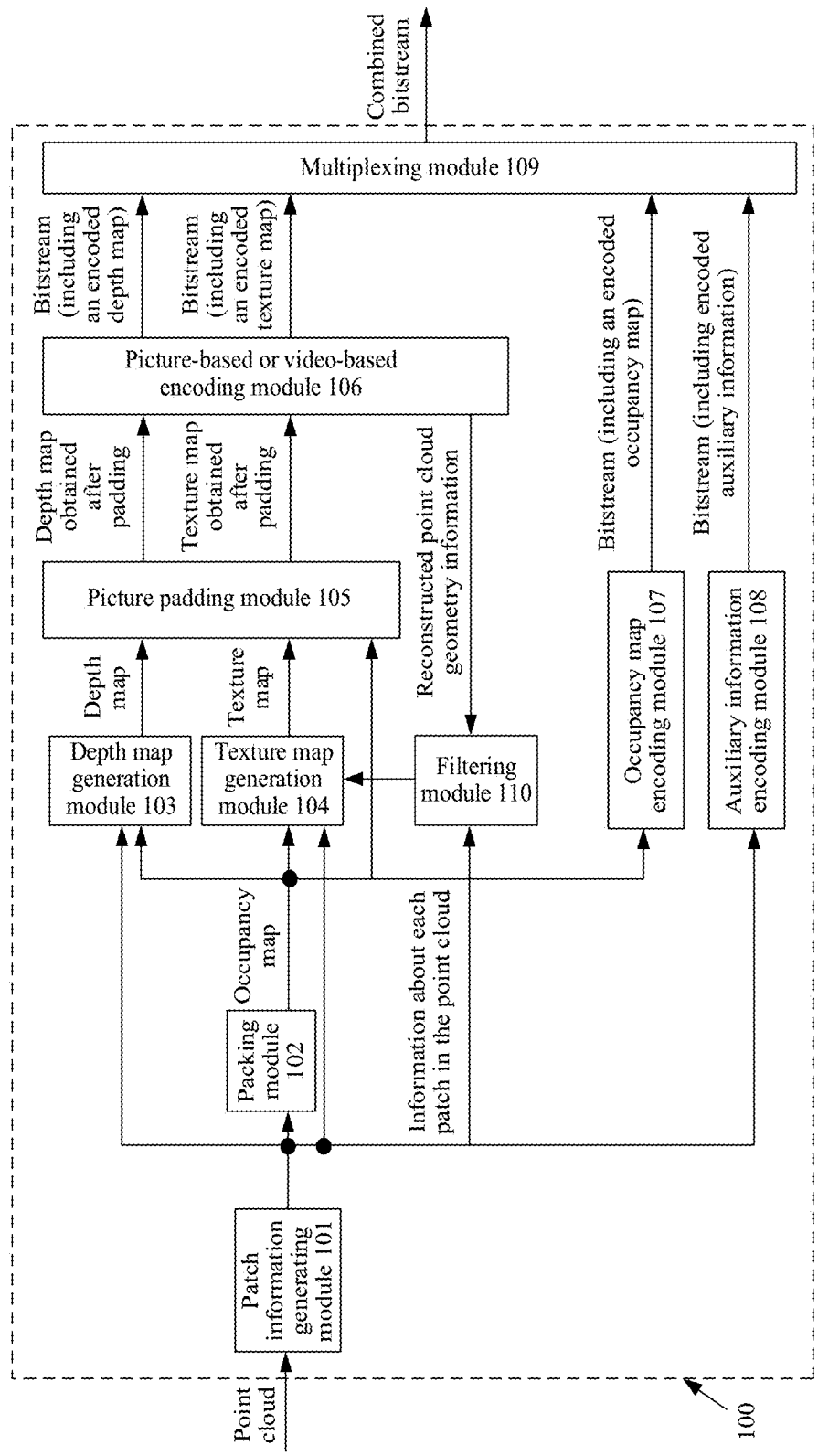
FIG. 2 is a schematic block diagram of an example encoder that is applicable to an embodiment of this application.

FIG. 2 is a schematic block diagram of an example encoder 100 that is applicable to an embodiment of this application. A Moving Picture Expert Group (MPEG) point cloud compression (PCC) encoding framework is used as an example for description in FIG. 2. In the example in FIG. 2, the encoder 100 may include a patch information generation module 101, a packing module 102, a depth map generation module 103, a texture map generation module 104, a picture padding module 105, a picture-based or video-based encoding module 106, an occupancy map encoding module 107, an auxiliary information encoding module 108, a multiplexing module 109, and the like.

The patch information generation module 101 is configured to segment a frame of point cloud into a plurality of patches by using a method, and obtain related information of the generated patches and the like. The patch is a set including some points in one frame of point cloud. Usually, one connected region corresponds to one patch. The related information of the patch may include but is not limited to at least one of the following information a quantity of patches obtained by segmenting the point cloud, location information of each patch in three-dimensional space, an index of a tangent axis of each patch, an index of a bitangent axis of each patch, an index of a normal axis of each patch, a depth map generated by projecting each patch onto a two-dimensional plane, a size of the depth map of each patch (for example, a length and a height of the depth map), an occupancy map of each patch, and the like. Some of the related information, for example, the quantity of patches obtained by segmenting the point cloud, the index of the normal axis of each patch, the size of the depth map of each patch, and location information of each patch in the point cloud, may be used as auxiliary information and sent to the auxiliary information encoding module 108 for encoding (that is, compression encoding). The occupancy map of each patch may be sent to the packing module 102 for packing. Specifically, the patches of the point cloud are arranged in a specific order (for example, arranged in descending (or ascending) order of lengths/heights of occupancy maps of the patches). Then, the occupancy maps of the patches are successively placed into available space for an occupancy map of the point cloud in an order of the arranged patches, to obtain the occupancy map of the point cloud. In addition, specific location information of each patch in the occupancy map of the point cloud, the depth map of each patch, and the like may be sent to the depth map generation module 103.

After obtaining the occupancy map of the point cloud, the packing module 102 may send the occupancy map of the point cloud to the occupancy map encoding module 107 for encoding, and may separately guide the depth map generation module 103 and the texture map generation module 104 by using the occupancy map of the point cloud. The depth map generation module 103 is configured to generate a depth map of the point cloud based on the occupancy map of the point cloud and the occupancy map and the depth map of each patch of the point cloud, and send the generated depth map to the picture padding module 105, so that the picture padding module 105 pads an empty pixel in the received depth map to obtain a padded depth map. Video encoding is performed on the padded depth map, video decoding is performed to obtain a decoded depth map of the point cloud, and geometry information of a reconstructed point cloud is obtained by using the decoded depth map, the occupancy map of the point cloud, and auxiliary information of each patch. Texture information of the point cloud and the geometry information of the reconstructed point cloud are sent to a coloring module, to color the reconstructed point cloud, so as to obtain texture information of the reconstructed point cloud. The texture map generation module 104 is configured to generate a texture map of the point cloud based on the occupancy map of the point cloud, the texture information of the reconstructed point cloud, and the occupancy map of each patch of the point cloud, and send the generated texture map to the picture padding module 105, so that the picture padding module 105 pads an empty pixel in the received texture map to obtain a padded texture map. Optionally, the texture map generation module 104 may alternatively generate a texture map of the point cloud based on information obtained through filtering performed by a filtering module 110 on the geometry information of the reconstructed point cloud.

The padded depth map and the padded texture map are sent by the picture padding module 105 to the picture-based or video-based encoding module 106, to perform picture-based or video-based encoding.

Finally, the picture-based or video-based encoding module 106, the occupancy map encoding module 107, and the auxiliary information encoding module 108 send obtained encoding results (that is, bitstreams) to the multiplexing module 109, and the multiplexing module 109 performs combination to form one bitstream, where the bitstream may be sent to the output interface 140.

It can be understood that the encoder 100 shown in FIG. 2 is merely an example. In specific implementation, the encoder 100 may include more or fewer modules than those shown in FIG. 2. This is not limited in this embodiment of this application.

Figure 3:
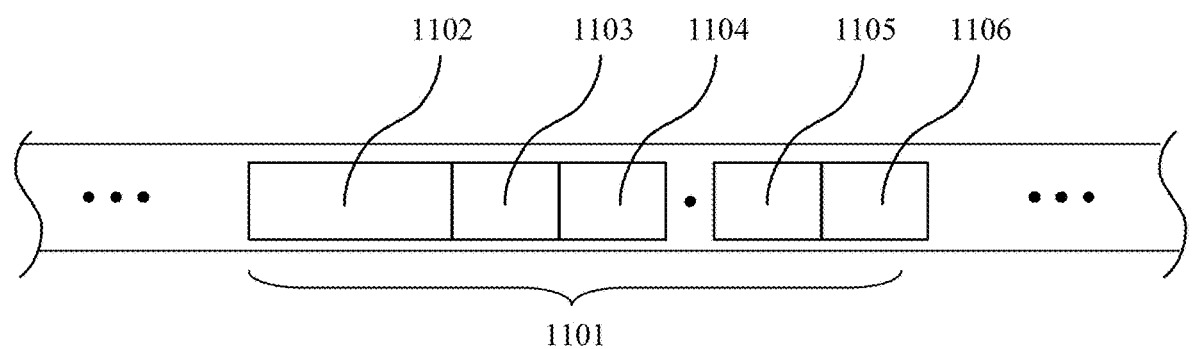
FIG. 3 is a schematic structural diagram of an example bitstream that is applicable to an embodiment of this application.

It can be learnt from the foregoing description that the auxiliary information encoding module 108 may encode patch level-based information (such as the index of the normal axis of the patch) and frame level-based information (such as the quantity of patches included in the point cloud) into a bitstream. In an example, the encoder 100 may perform encoding based on a point cloud group, where each point cloud group may include at least two frames of point clouds. In this case, the auxiliary information encoding module 108 may further encode GOF level-based information (such as a quantity of frames of point clouds included in a point cloud group) into a bitstream. FIG. 3 is a schematic structural diagram of an example bitstream that is applicable to an embodiment of this application.

The bitstream shown in FIG. 3 includes a part 1101 used to describe metadata information (which may also be referred to as a syntax element) in the bitstream, and the part 1101 may specifically include the following fields.

A field 1102 is metadata information of a frame header in a GOF, is used to describe GOF level-based information, and may include, for example, identifier information of the GOF, a quantity of frames of point clouds included in the GOF, and common information of all frames of point clouds in the GOF (such as the following information used to indicate description information of a bounding box size of a point cloud group).

A field 1103 is metadata information of the first frame of point cloud in the GOF, is used to describe frame level-based information related to the first frame of point cloud, and may include, for example, a quantity of patches included in the first frame of point cloud, resolutions of occupancy maps of all patches, a maximum quantity of patches that can be included in each smallest unit in an occupancy map of the point cloud, and common information of all the patches in the first frame of point cloud (such as the following information used to indicate description information of a bounding box size of the point cloud).

A field 1104 is metadata information of a patch of the first frame of point cloud in the GOF, is used to describe patch level-based information related to the first frame of point cloud, and may specifically include metadata information of the first patch in the first frame of point cloud, . . . , metadata information of the $i^{th}$ patch, . . . , and metadata information of the $I^{th}$ patch successively, where $1 \leq i \leq I$, both i and I are integers, and I is the quantity of patches included in the first frame of point cloud. The metadata information of the patch may include an index of a normal axis of the patch and the like.

A field 1105 is metadata information of the $j^{th}$ frame of point cloud in the GOF, and is used to describe frame level-based information related to the $j^{th}$ frame of point cloud, where $1 < j \leq J$, both j and J are integers, and J is the quantity of frames of point clouds included in the GOF.

A field 1106 is metadata information of a patch of the $j^{th}$ frame of point cloud in the GOF, and is used to describe patch level-based information related to the $i^{th}$ frame of point cloud.

Figure 4:
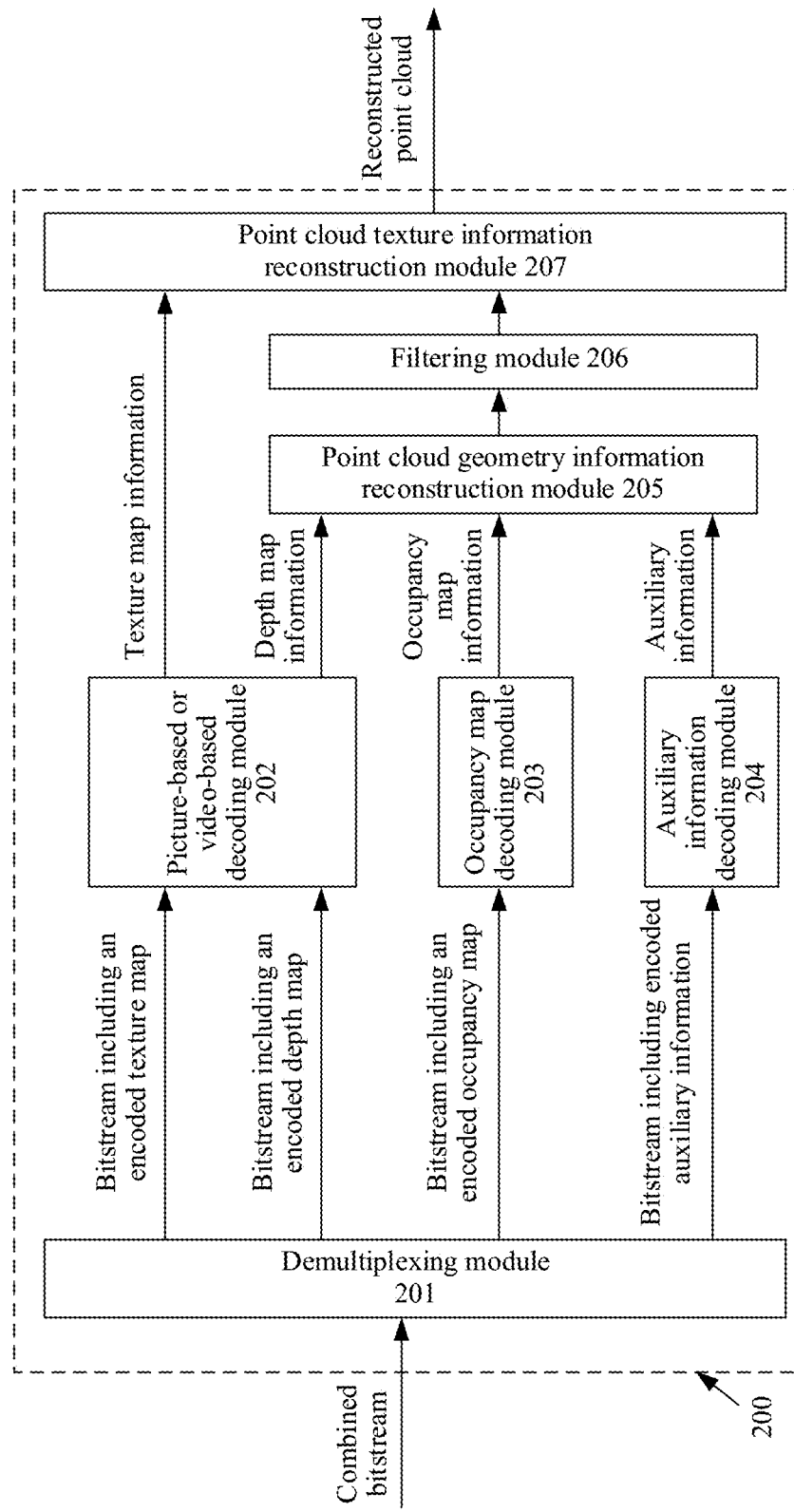
FIG. 4 is a schematic block diagram of an example decoder that is applicable to an embodiment of this application.

FIG. 4 is a schematic block diagram of an example decoder 200 that is applicable to an embodiment of this application. An MPEG PCC decoding framework is used as an example for description in FIG. 4. In the example in FIG. 4, the decoder 200 may include a demultiplexing module 201, a picture-based or video-based decoding module 202, an occupancy map decoding module 203, an auxiliary information decoding module 204, a point cloud geometry information reconstruction module 205, a filtering module 206, and a point cloud texture information reconstruction module 207.

The demultiplexing module 201 is configured to send an input bitstream (that is, a combined bitstream) to a corresponding decoding module. Specifically, the demultiplexing module 201 sends a bitstream including an encoded texture map and a bitstream including an encoded depth map to the picture-based or video-based decoding module 202, sends a bitstream including an encoded occupancy map to the occupancy map decoding module 203, and sends a bitstream including encoded auxiliary information to the auxiliary information decoding module 204.

The picture-based or video-based decoding module 202 is configured to decode the received encoded texture map and the received encoded depth map, send texture map information obtained through decoding to the point cloud texture information reconstruction module 207, and send depth map information obtained through decoding to the point cloud geometry information reconstruction module 205. The occupancy map decoding module 203 is configured to decode the received bitstream including the encoded occupancy map, and send occupancy map information obtained through decoding to the point cloud geometry information reconstruction module 205. The auxiliary information decoding module 204 is configured to decode the received encoded auxiliary information, and send information that indicates the auxiliary information and that is obtained through decoding to the point cloud geometry information reconstruction module 205.

The point cloud geometry information reconstruction module 205 is configured to reconstruct point cloud geometry information based on the received occupancy map information and the received auxiliary information. After being filtered by the filtering module 206, reconstructed point cloud geometry information is sent to the point cloud texture information reconstruction module 207. The point cloud texture information reconstruction module 207 is configured to reconstruct point cloud texture information, to obtain a reconstructed point cloud.

It can be understood that the decoder 200 shown in FIG. 4 is merely an example. In specific implementation, the decoder 200 may include more or fewer modules than those shown in FIG. 4. This is not limited in this embodiment of this application.

To facilitate understanding of the technical solutions provided in the embodiments of this application, the following describes, by using an example, a patch generation process of the patch information generation module 101 and patch-related information obtained by the patch information generation module 101.

Figure 5:
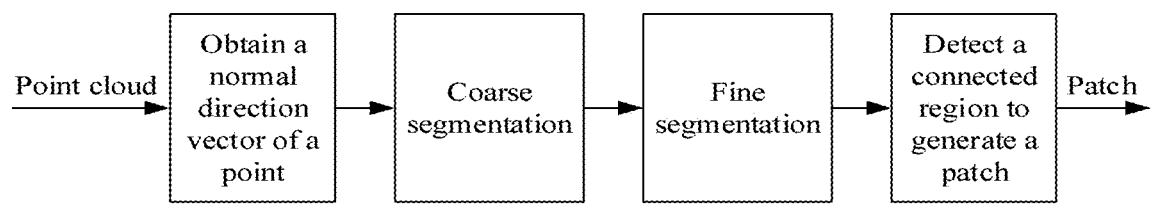
FIG. 5 is a schematic diagram of a patch generation process that is applicable to Test Model Category 2 (TMC2).

FIG. 5 is a schematic diagram of a patch generation process that is applicable to TMC2. Details may include a K-dimension (KD) tree is first constructed based on a point cloud, a neighboring point of each point in the point cloud is determined based on the KD tree, and a normal direction vector (that is, a normal vector) of each point is obtained based on the neighboring point of the point. Then, coarse segmentation is performed on the point cloud (that is, a projection plane of each point is determined) based on the normal direction vector of each point and a predefined projection plane. One type of predefined projection plane is six planes of a bounding box of the point cloud. A coarse segmentation method may include separately calculating included angles between the normal direction vector of each point and normal direction vectors of the six planes, and selecting a plane corresponding to a smallest included angle as a projection plane of the point. Subsequently, fine segmentation is performed on the projection plane, of each point, obtained through coarse segmentation. Specifically, a coarse segmentation result is adjusted through iterative updating by using a projection plane of the neighboring point of each point. The projection plane of each point in the point cloud is determined based on a fine segmentation result. Finally, a connected region is detected based on each projection plane, to generate a patch. For example, a set including all sampling points in a connected region is a patch.

Figures 6A, 6B, 6C:
FIG. 6A to FIG. 6C are a schematic diagram of an example patch that is applicable to an embodiment of this application.

FIG. 6A to FIG. 6C are a schematic diagram of an example patch that is applicable to an embodiment of this application. FIG. 6A represents one frame of point cloud. FIG. 6B represents patches generated based on FIG. 6A. A set including points in each connected region in FIG. 6B is a patch.

As described above, the patch information generation module 101 may further obtain related information of the patches generated based on the point cloud. The related information may include an index of a tangent axis of each patch, an index of a bitangent axis of each patch, an index of a normal axis of each patch, and the like.

The tangent axis of the patch is a coordinate axis on which a tangent of the patch is located. The bitangent axis of the patch is a coordinate axis on which a bitangent of the patch is located. The bitangent of the patch is perpendicular to the tangent axis of the patch. The normal axis of the patch is a coordinate axis on which a normal line of the patch is located. The normal axis of the patch is perpendicular to a two-dimensional plane (that is, a projection plane of the patch) on which the tangent axis and the bitangent axis of the patch are located. To simplify subsequent processing, an example in which "each of the tangent axis, the bitangent axis, and the normal axis of the patch is one of coordinate axes in a world coordinate system" is used for description in the embodiments of this application. This can reduce complexity of coordinate system transformation during projection of the patch onto a two-dimensional plane. Certainly, this application is not limited thereto. In actual implementation, a three-dimensional coordinate system including "the normal axis, the tangent axis, and the bitangent axis of the patch" may be alternatively obtained by performing matrix transformation on the world coordinate system (or another reference coordinate system).

In the MPEG PCC encoding framework, the tangent axis and the bitangent axis of the patch are usually determined according to the following method first determining the index of the normal axis of the patch, and then searching Table 2 to obtain the index of the tangent axis of the patch and the index of the bitangent axis of the patch. Indexes of coordinate axes in Table 2 are obtained based on Table 1.

TABLE 2

| Index of a normal axis of a patch | Index of a tangent axis of the patch | Index of a bitangent axis of the patch |
| --- | --- | --- |
| 0 | 2 | 1 |
| 1 | 2 | 0 |
| 2 | 0 | 1 |

Referring to Table 2, it can be learned that when the index of the normal axis of the patch is 0, the index of the tangent axis of the patch is 2, and the index of the bitangent axis of the patch is 1. In an embodiment, when the normal axis of the patch is the x-axis, the tangent axis of the patch is the z-axis, and the bitangent axis of the patch is the y-axis. A principle of another example is similar to that described herein, and no more examples are enumerated.

Figure 7A:
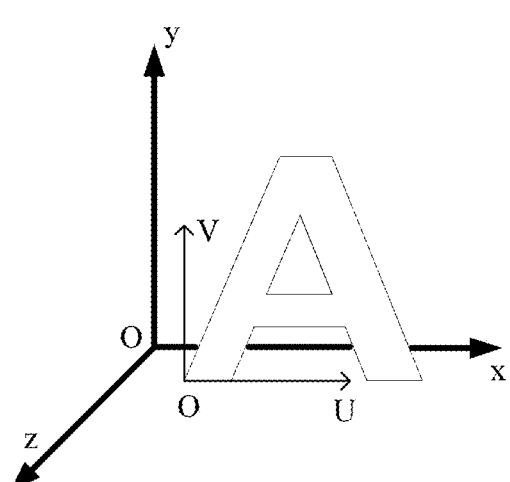
FIG. 7A and FIG. 7B are a schematic diagram of projection of a patch from three-dimensional space to a two-dimensional plane in other approaches.
Figure 7B:
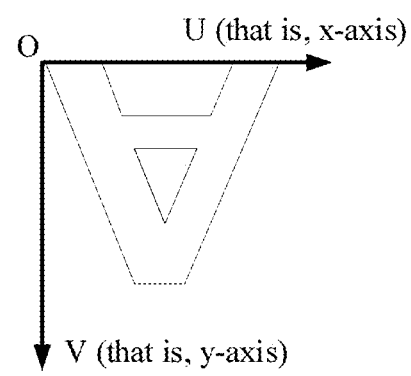

FIG. 7A and FIG. 7B are a schematic diagram of projection of a patch from three-dimensional space to a two-dimensional plane. In FIG. 7A and FIG. 7B, an origin of coordinates is denoted as O. It is assumed that a letter A shown in FIG. 7A is a patch in the three-dimensional space, and a normal axis of the patch is the z-axis. In addition, it is assumed that on the two-dimensional plane, a tangent direction of the patch is a horizontal axis (that is, a U-axis), and a bitangent direction of the patch is a vertical axis (that is, a V-axis). In this case, it can be learned from Table 2 that a tangent axis of the patch is the x-axis, and the bitangent axis of the patch is the y-axis. In other words, on the two-dimensional plane to which the patch is mapped, the U-axis is the x-axis, and the V-axis is the y-axis. Based on this, after the patch is projected onto the two-dimensional plane, a project picture shown in FIG. 7B can be obtained.

After determining a tangent axis and a bitangent axis of each patch, the patch information generation module 101 may further obtain a projected picture obtained by projecting the patch onto the two-dimensional plane. A coordinate value of each point in the projected picture is based on a coordinate system determined by using "the tangent axis and the bitangent axis of the patch". Then, the packing module 102 may pack projected pictures of all patches on the two-dimensional plane (that is, the occupancy maps of the patches described in this specification), to obtain an occupancy map of a point cloud.

Figures 8A, 8B:
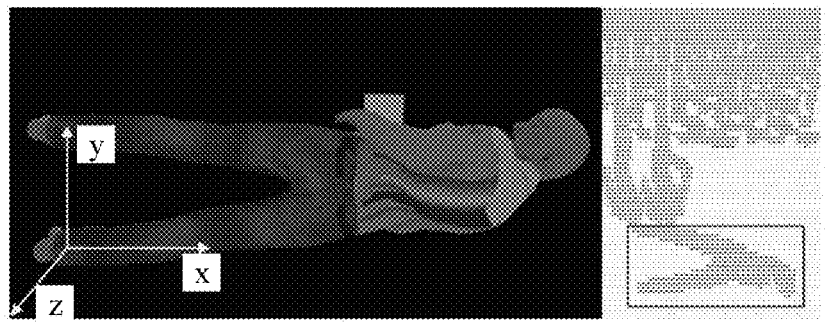
FIG. 8A and FIG. 8B are a schematic diagram of an occupancy map of a point cloud in other approaches.

FIG. 8A and FIG. 8B are a schematic diagram of an occupancy map of a point cloud. The patch information generation module 101 may generate patches from the point cloud shown in FIG. 8A, and obtain a tangent axis and a bitangent axis of each patch based on Table 2, to obtain an occupancy map of each patch. Based on this, after packing occupancy maps of the patches, the packing module 102 may obtain an occupancy map of a point cloud shown in FIG. 8B. It can be learned from FIG. 8B that in the occupancy map of the point cloud, some patches with relatively great heights (that is, a side on which the y-axis is located) are vertically arranged and some patches with relatively great heights are horizontally arranged (for example, patches in a rectangular box). This causes a large amount of empty space in the occupancy map of the point cloud, such as a region in which empty pixels are located in FIG. 8B. In addition, this leads to a relatively large size of the occupancy map of the point cloud, and is unfavorable for subsequent video compression encoding.

Moreover, as shown in FIG. 6A to FIG. 6C, if the tangent axis and the bitangent axis of each patch are obtained based on Table 2, an occupancy map shown in FIG. 6C can be obtained based on patches shown in FIG. 6B.

The following describes a point cloud encoding method and a point cloud decoding method that are provided in the embodiments of this application.

Figure 9:
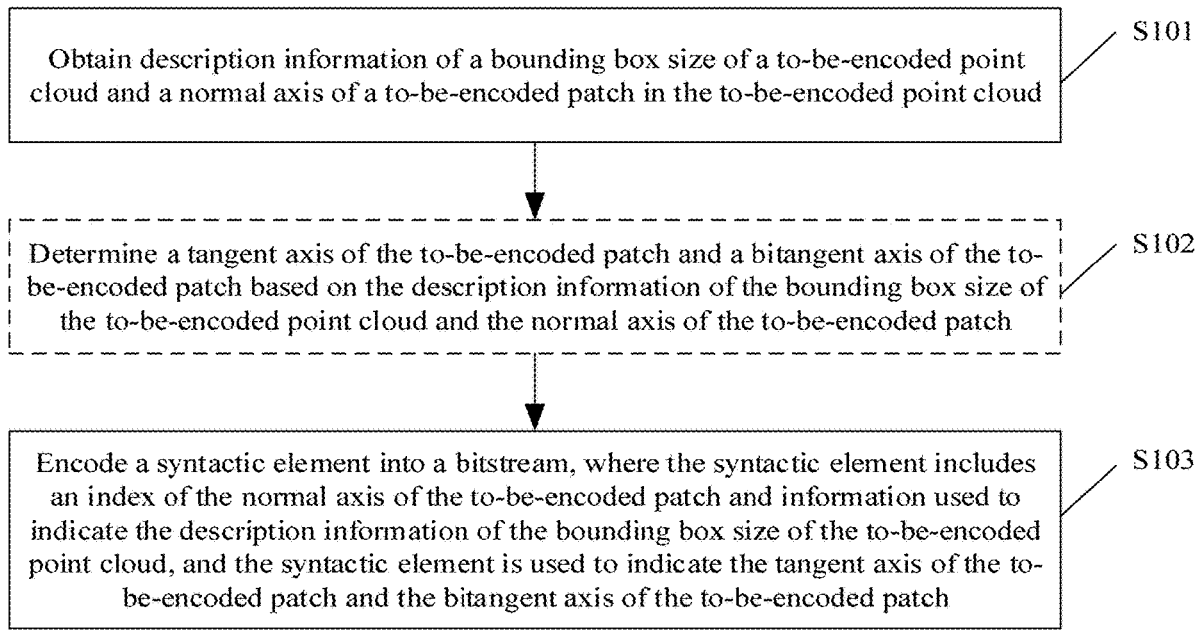
FIG. 9 is a schematic flowchart of a point cloud encoding method according to an embodiment of this application.

FIG. 9 is a schematic flowchart of a point cloud encoding method according to an embodiment of this application. For example, with reference to the point cloud coding system shown in FIG. 1, each step in this embodiment may be performed by the source apparatus 10 in the point cloud coding system, and more specifically, may be performed by the encoder 100 in the source apparatus 10. The method shown in FIG. 9 may include the following steps.

S101. Obtain description information of a bounding box size of a to-be-encoded point cloud and a normal axis of a to-be-encoded patch in the to-be-encoded point cloud. The to-be-encoded point cloud may be any frame of to-be-encoded point cloud. The to-be-encoded patch may be any patch in the to-be-encoded point cloud.

Figure 10:
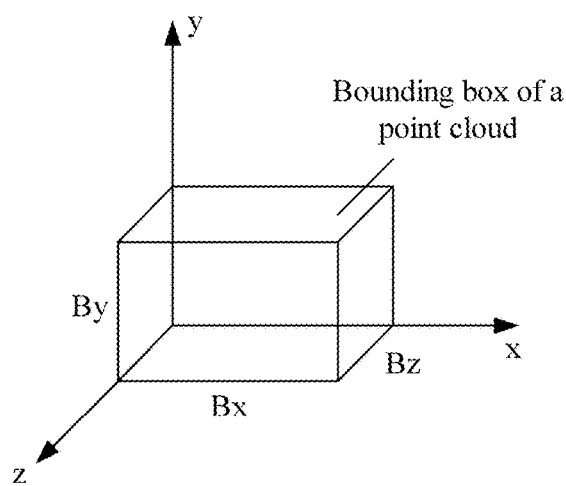
FIG. 10 is a schematic diagram of a location of a bounding box of a point cloud in a world coordinate system according to an embodiment of this application.

A bounding box of a point cloud refers to a minimum cuboid surrounding the point cloud. For ease of description, in this embodiment of this application, each side of the bounding box of the point cloud is parallel to or perpendicular to a coordinate axis such as the x-axis, the y-axis, or the z-axis of a world coordinate system. FIG. 10 is a schematic diagram of a location of a bounding box of a point cloud in a world coordinate system according to an embodiment of this application.

A bounding box size of the point cloud may also be referred to as side lengths of the bounding box of the point cloud, a three-dimensional space size of the bounding box of the point cloud, or a geometric space size of the bounding box of the point cloud. For example, Bx, By, and Bz may be used to represent the bounding box size of the point cloud. Bx refers to a size of a side, of the bounding box of the point cloud, on the x-axis (or parallel to the x-axis), By refers to a size of a side, of the bounding box of the point cloud, on the y-axis (or parallel to the y-axis), and Bz refers to a size of a side, of the bounding box of the point cloud, on the z-axis (or parallel to the z-axis). For example, it is assumed that the to-be-encoded patch is the $i^{th}$ point in the to-be-encoded point cloud, i=0, 1, . . . , or N−1, and N is a quantity of points in the to-be-encoded point cloud. In this case, a method for obtaining the bounding box size of the to-be-encoded point cloud may be $Bx=\max\{p[i].x\}-\min\{p[i].x\}$, $By=\max\{p[i].y\}-\min\{p[i].y\}$, and $Bz=\max\{p[i].z\}-\min\{p[i].z\}$. $p[i].x$ is a coordinate value of $p[i]$ on the x-axis, $p[i].y$ is a coordinate value of $p[i]$ on the y-axis, and $p[i].z$ is a coordinate value of $p[i]$ on the z-axis.

Description information of the bounding box size of the point cloud is information used to describe the bounding box size of the point cloud, and may specifically include a size relationship for the bounding box size of the point cloud (that is, a size relationship among Bx, By, and Bz), a coordinate axis (for example, the x-axis, the y-axis, or the z-axis) on which a longest side of the bounding box of the point cloud is located, or the like. During specific implementation, whether the description information of the bounding box size of the point cloud is specifically the size relationship for the bounding box size of the point cloud or the coordinate axis on which the longest side of the bounding box of the point cloud is located may be predefined, for example, predefined according to a protocol. Certainly, this application is not limited thereto. For example, the description information of the bounding box size of the point cloud may be alternatively indicated by an encoder to a decoder by encoding indication information into a bitstream. It may be understood that the indication information is frame level-based information.

It should be noted that, usually, a side corresponding to a largest value in Bx, By, and Bz is the longest side of the bounding box of the point cloud, a side corresponding to a smallest value is a shortest side of the bounding box of the point cloud, and a side corresponding to a value between the largest value and the smallest value is a second longest side of the bounding box of the point cloud. In addition, if there are two largest values in Bx, By, and Bz, either of the two values may be used as the longest side of the bounding box of the point cloud, and the other is used as a second longest side. For example, if Bx=By>Bz, Bx is the longest side and By is the second longest side, or By is the longest side and Bx is the second longest side. If Bx, By, and Bz are equal, any one of the three may be used as the longest side, either of the remaining two is used as a second longest side, and the other is used as a shortest side.

How to obtain the normal axis of the to-be-encoded patch is not limited in this embodiment of this application. For example, reference may be made to other approaches. In this embodiment of this application, an example in which the normal axis of the to-be-encoded patch is one of the x-axis, the y-axis, and the z-axis of the world coordinate system is used for description.

The description information of the bounding box size of the to-be-encoded point cloud and the normal axis of the to-be-encoded patch are used to determine a tangent axis of the to-be-encoded patch and a bitangent axis of the to-be-encoded patch. For example, optionally, the tangent axis of the to-be-encoded patch and the bitangent axis of the to-be-encoded patch may be determined by performing the following step S102.

S102. Determine the tangent axis of the to-be-encoded patch and the bitangent axis of the to-be-encoded patch based on the description information of the bounding box size of the to-be-encoded point cloud and the normal axis of the to-be-encoded patch.

Optionally, the encoder may predefine, for example, according to a protocol, a mapping relationship among a plurality of types of description information of bounding box sizes of point clouds (or indexes of the plurality of types of description information), a plurality of types of normal axes of a patch (or indexes of the plurality of types of normal axes), a plurality of types of tangent axes of the patch (or indexes of the plurality of types of tangent axes), and a plurality of types of bitangent axes of the patch (or indexes of the plurality of types of bitangent axes). Then, after obtaining the description information of the bounding box size of the to-be-encoded point cloud (or an index of the description information) and the normal axis of the to-be-encoded patch (or an index of the normal axis of the to-be-encoded patch), the encoder obtains the tangent axis of the to-be-encoded patch (or an index of the tangent axis of the to-be-encoded patch) and the bitangent axis of the to-be-encoded patch (or an index of the bitangent axis of the to-be-encoded patch) based on the foregoing mapping relationship.

A specific representation form of the mapping relationship is not limited in this embodiment of this application. For example, the mapping relationship may be represented in a form of a table, a formula, or logical determining (for example, an if else operation or a switch operation) based on a condition. An example in which the mapping relationship is specifically represented in a form of a table is mainly used below for description. Based on this, when performing S102, the encoder may obtain the tangent axis of the to-be-encoded patch and the bitangent axis of the to-be-encoded patch by searching the table. It may be understood that the foregoing mapping relationship is specifically represented in one or more tables. This is not limited in this embodiment of this application. For ease of description, in this embodiment of this application, an example in which these tables are specifically represented in one table is used for description. This is uniformly described herein, and is not described below again.

If the description information of the bounding box size of the point cloud includes the size relationship for the bounding box size of the point cloud, possible description information of the bounding box size of the point cloud and an index of the possible description information may be shown in Table 3.

TABLE 3

| | Size relationship for a bounding box size of a point cloud | | | | | |
|---|---|---|---|---|---|---|
| | Bx ≥ By ≥ Bz | Bx > Bz > By | By > Bx > Bz | By > Bz ≥ Bx | Bz ≥ Bx > By | Bz > By > Bx |
| Index of the size relationship for the bounding box size of the point cloud | 0 | 1 | 2 | 3 | 4 | 5 |

Bx≥By≥Bz may include four cases in total Bx>By>Bz, Bx=By>Bz, Bx>By=Bz, and Bx=By=Bz. It may be considered that in Table 3, an example in which "Bx=By>Bz, Bx>By=Bz, and Bx=By=Bz" each share the index "0" with "Bx>By>Bz" is used for description. Alternatively, "Bx=By>Bz" and "By>Bx>Bz" may share the index "2". In this case, a size relationship corresponding to the index "2" may be replaced with "By≥Bx>Bz". Alternatively, "Bx>By=Bz" and "Bx>Bz>By" may share the index "1". In this case, a size relationship corresponding to the index "1" may be replaced with "Bx>Bz≥By". Alternatively, "Bx=By=Bz" may share an index with any size relationship in Table 3. For example, if "Bx=By=Bz" and "Bz>By>Bx" share the index "5", a size relationship corresponding to the index "5" may be replaced with "Bz≥By≥Bx". Other examples are not enumerated one by one.

By>Bz≥Bx may include two cases in total By>Bz>Bx and By>Bz=Bx. It may be considered that in Table 3, an example in which "By>Bz=Bx" and "By>Bz>Bx" share the index 3 is used for description. Alternatively, "By>Bz=Bx" and "By>Bx>Bz" may share the index "2". In this case, a size relationship corresponding to the index "2" may be replaced with "By>Bx≥Bz".

Bz≥Bx>By may include Bz>Bx>By and Bz=Bx>By. It may be considered that in Table 3, an example in which "Bz=Bx>By" and "Bz>Bx>By" share the index "4" is used for description. Alternatively, "Bz=Bx>By" and "Bx>Bz>By" may share the index "1". In this case, a size relationship corresponding to the index "1" may be replaced with "Bx≥Bz>By".

It should be noted that any alternative solution described above may be combined with Table 3 to form a new table used to indicate "possible description information of the bounding box size of the point cloud and an index of the possible description information". In addition, in principle, in a case of no conflict, any two or more of the foregoing alternative solutions may be combined with Table 3 to form a new table used to indicate "possible description information of the bounding box size of the point cloud and an index of the possible description information". In addition, an index of each size relationship provided in Table 3 is merely an example, and does not constitute a limitation on the index of the size relationship for the bounding box size of the point cloud in this embodiment of this application. All the following specific examples are described by using "the possible description information of the bounding box size of the point cloud and the index of the possible description information" in Table 3 as an example. This is uniformly described herein, and is not described below again.

S103. Encode a syntax element into a bitstream, where the syntax element includes the index of the normal axis of the to-be-encoded patch and information used to indicate the description information of the bounding box size of the to-be-encoded point cloud, and the syntax element is used to indicate the tangent axis of the to-be-encoded patch and the bitangent axis of the to-be-encoded patch. In other words, this embodiment of this application supports a technical solution of implicitly indicating the tangent axis of the to-be-encoded patch and the bitangent axis of the to-be-encoded patch by using the information used to indicate the description information of the bounding box size of the to-be-encoded point cloud and the index of the normal axis of the to-be-encoded patch.

In an example, the information used to indicate the description information of the bounding box size of the to-be-encoded point cloud is frame level-based information. Therefore, with reference to the bitstream structure shown in FIG. 3, if the to-be-encoded point cloud is the first frame of point cloud in a GOF, in S103, the information used to indicate the description information of the bounding box size of the to-be-encoded point cloud may be encoded into a field 1103 in the bitstream. Based on this, the index of the normal axis of the to-be-encoded patch may be encoded into a field 1104 in the bitstream.

It may be understood that, because the information used to indicate the description information of the bounding box size of the to-be-encoded point cloud and the index of the normal axis of the to-be-encoded patch are information of different levels (one is frame level-based information, and the other is patch level-based information), the two pieces of information may be encoded into the bitstream at different times. Certainly, this application is not limited thereto.

For example, with reference to the encoder shown in FIGS. 2, S101 and S102 may be specifically performed by the patch information generation module 101 in the encoder. S103 may be performed by the auxiliary information encoding module 108 in the encoder.

A sequence of performing S102 and S103 is not limited in this embodiment of this application. For example, S102 may be performed before S103, or S103 may be performed before S102, or S102 and S103 may be performed at the same time.

Optionally, after S102 is performed and before S103 is performed, the method may further include projecting the to-be-encoded patch from a three-dimensional coordinate system to a two-dimensional coordinate system based on the tangent axis and the bitangent axis of the to-be-encoded patch. For subsequent steps to be performed by the encoder, refer to the foregoing description of the encoder shown in FIG. 2, but this is not limited.

For descriptions of beneficial effects of this embodiment, refer to the foregoing summary. Details are not described herein again.

Optionally, if the description information of the bounding box size of the point cloud includes a size relationship among side lengths of the bounding box of the point cloud, a mapping relationship among description information of a bounding box size of a point cloud, a normal axis of a patch, a tangent axis of the patch, and a bitangent axis of the patch may be specifically the following solution 1 or solution 2. Whether the solution 1 or the solution 2 is specifically used may be predefined (for example, predefined according to a protocol), or may be notified by the encoder to the decoder by encoding indication information into the bitstream. Specific content of the indication information is not limited in this embodiment of this application. For example, the indication information may be identifier information of the solution 1 or the solution 2, or may be a mapping rule in the following manner 3. Certainly, this embodiment of this application is not limited thereto.

Optionally, if the description information of the bounding box size of the point cloud includes the coordinate axis on which the longest side of the bounding box of the point cloud is located, a mapping relationship among description information of a bounding box size of a point cloud, a normal axis of a patch, a tangent axis of the patch, and a bitangent axis of the patch may be specifically the following solution 3 or solution 4. Whether the solution 3 or the solution 4 is specifically used may be predefined (for example, predefined according to a protocol), or may be notified by the encoder to the decoder by encoding indication information into the bitstream. Specific content of the indication information is not limited in this embodiment of this application. For example, the indication information may be identifier information of the solution 3 or the solution 4, or may be a mapping rule in the following manner 3. Certainly, this embodiment of this application is not limited thereto.

Solution 1.

When a normal axis of a patch is different from a coordinate axis on which a longest side of a bounding box of a point cloud including the patch is located, the coordinate axis on which the longest side of the bounding box of the point cloud is located is a bitangent axis of the patch. In this case, a coordinate axis perpendicular to both the normal axis of the patch and the bitangent axis of the patch is a tangent axis of the patch.

When a normal axis of a patch is the same as a coordinate axis on which a longest side of a bounding box of a point cloud including the patch is located, a coordinate axis on which a second longest side of the bounding box of the point cloud is located is a bitangent axis of the patch, and a coordinate axis on which a shortest side of the bounding box of the point cloud is located is a tangent axis of the patch.

Based on the solution 1, a "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided in this embodiment of this application may be shown in Table 4.

TABLE 4

| Index of a size relationship for a bounding box size of a point cloud | Index of a normal axis of a patch | Index of a tangent axis of the patch | Index of a bitangent axis of the patch |
|---|---|---|---|
| 0 | 0 | 2 | 1 |
|   | 1 | 2 | 0 |
|   | 2 | 1 | 0 |
| 1 | 0 | 1 | 2 |
|   | 1 | 2 | 0 |
|   | 2 | 1 | 0 |
| 2 | 0 | 2 | 1 |
|   | 1 | 2 | 0 |
|   | 2 | 0 | 1 |
| 3 | 0 | 2 | 1 |
|   | 1 | 0 | 2 |
|   | 2 | 0 | 1 |
| 4 | 0 | 1 | 2 |
|   | 1 | 0 | 2 |
|   | 2 | 1 | 0 |
| 5 | 0 | 1 | 2 |
|   | 1 | 0 | 2 |
|   | 2 | 0 | 1 |

For example, referring to Table 4, it can be learned that when an index of a size relationship for a bounding box size of a point cloud is 0, if an index of a normal axis of a patch is 0, an index of a tangent axis of the patch is 2, and an index of a bitangent axis of the patch is 1. With reference to Table 1 and Table 3, it can be learned that this example is specifically as follows. When Bx≥By≥Bz, if the normal axis of the patch is the x-axis, the tangent axis of the patch is the z-axis, and the bitangent axis of the patch is the y-axis.

For another example, referring to Table 4, it can be learned that when an index of a size relationship for a bounding box size of a point cloud is 4, if an index of a normal axis of a patch is 1, an index of a tangent axis of the patch is 0, and an index of a bitangent axis of the patch is 2. With reference to Table 1 and Table 3, it can be learned that this example is specifically as follows. When Bz≥Bx>By, if the normal axis of the patch is the y-axis, the tangent axis of the patch is the x-axis, and the bitangent axis of the patch is the z-axis.

A principle of another example is similar to that described herein, and no more examples are enumerated.

Solution 2.

When a normal axis of a patch is different from a coordinate axis on which a longest side of a bounding box of a point cloud including the patch is located, the coordinate axis on which the longest side of the bounding box of the point cloud is located is a tangent axis of the patch. In this case, a coordinate axis perpendicular to both the normal axis of the patch and the tangent axis of the patch is a bitangent axis of the patch.

When a normal axis of a patch is the same as a coordinate axis on which a longest side of a bounding box of a point cloud including the patch is located, a coordinate axis on which a second longest side of the bounding box of the point cloud is located is a tangent axis of the patch, and a coordinate axis on which a shortest side of the bounding box of the point cloud is located is a bitangent axis of the patch.

Based on the solution 2, a "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided in this embodiment of this application may be shown in Table 5.

TABLE 5

| Index of a size relationship for a bounding box size of a point cloud | Index of a normal axis of a patch | Index of a tangent axis of the patch | Index of a bitangent axis of the patch |
|---|---|---|---|
| 0 | 0 | 1 | 2 |
|   | 1 | 0 | 2 |
|   | 2 | 0 | 1 |
| 1 | 0 | 2 | 1 |
|   | 1 | 0 | 2 |
|   | 2 | 0 | 1 |
| 2 | 0 | 1 | 2 |
|   | 1 | 0 | 2 |
|   | 2 | 1 | 0 |
| 3 | 0 | 1 | 2 |
|   | 1 | 2 | 0 |
|   | 2 | 1 | 0 |
| 4 | 0 | 2 | 1 |
|   | 1 | 2 | 0 |
|   | 2 | 0 | 1 |
| 5 | 0 | 2 | 1 |
|   | 1 | 2 | 0 |
|   | 2 | 1 | 0 |

For example, referring to Table 5, it can be learned that when an index of a size relationship for a bounding box size of a point cloud is 0, if an index of a normal axis of a patch is 0, an index of a tangent axis of the patch is 1, and an index of a bitangent axis of the patch is 2. With reference to Table 1 and Table 3, it can be learned that this example is specifically as follows. When Bx≥By≥Bz, if the normal axis of the patch is the x-axis, the tangent axis of the patch is the y-axis, and the bitangent axis of the patch is the z-axis. A principle of another example is similar to that described herein, and no more examples are enumerated.

Solution 3.

When a normal axis of a patch is different from a coordinate axis on which a longest side of a bounding box of a point cloud including the patch is located, the coordinate axis on which the longest side of the bounding box of the point cloud is located is a bitangent axis of the patch. In this case, a coordinate axis perpendicular to both the normal axis of the patch and the bitangent axis of the patch is a tangent axis of the patch.

When a normal axis of a patch is the same as a coordinate axis on which a longest side of a bounding box of a point cloud including the patch is located, one of a coordinate axis on which a second longest side of the bounding box of the point cloud is located and a coordinate axis on which a shortest side of the bounding box of the point cloud is located is a bitangent axis of the patch, and the other is a tangent axis of the patch. Specifically, when the normal axis of the patch is the same as the coordinate axis on which the longest side of the bounding box of the point cloud including the patch is located, the coordinate axis on which the second longest side of the bounding box of the point cloud is located may be the bitangent axis of the patch, and the coordinate axis on which the shortest side of the bounding box of the point cloud is located is the tangent axis of the patch, or the coordinate axis on which the shortest side of the bounding box of the point cloud is located may be the bitangent axis of the patch, and the coordinate axis on which the second longest side of the bounding box of the point cloud is located is the tangent axis of the patch.

Based on the solution 3, a "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided in this embodiment of this application may be shown in Table 6.

TABLE 6

| Index of a coordinate axis on which a longest side of a bounding box of a point cloud is located | Index of a normal axis of a patch | Index of a tangent axis of the patch | Index of a bitangent axis of the patch |
|---|---|---|---|
| 0 | 0 | 1 | 2 |
|   | 1 | 2 | 0 |
|   | 2 | 1 | 0 |
| 1 | 0 | 2 | 1 |
|   | 1 | 0 | 2 |
|   | 2 | 0 | 1 |
| 2 | 0 | 1 | 2 |
|   | 1 | 0 | 2 |
|   | 2 | 0 | 1 |

For example, referring to Table 6, it can be learned that when an index of a coordinate axis on which a longest side of a bounding box of a point cloud is located is 0, if an index of a normal axis of a patch is 2, an index of a tangent axis of the patch is 1, and an index of a bitangent axis of the patch is 0. With reference to Table 1, it can be learned that this example is specifically as follows. When the coordinate axis on which the longest side of the bounding box of the point cloud is located is the x-axis, if the normal axis of the patch is the z-axis, the tangent axis of the patch is the y-axis, and the bitangent axis of the patch is the x-axis. A principle of another example is similar to that described herein, and no more examples are enumerated.

Table 6 shows merely an example of the "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided based on the solution 3. Alternatively, when the coordinate axis on which the longest side of the bounding box of the point cloud is located is the x-axis, and the coordinate axis on which the longest side of the bounding box of the point cloud is located is the same as the normal axis of the patch, the z-axis is the tangent axis of the patch, and the y-axis is the bitangent axis of the patch. Alternatively, when the coordinate axis on which the longest side of the bounding box of the point cloud is located is the y-axis, and the coordinate axis on which the longest side of the bounding box of the point cloud is located is the same as the normal axis of the patch, the z-axis is the tangent axis of the patch, and the x-axis is the bitangent axis of the patch. Alternatively, when the coordinate axis on which the longest side of the bounding box of the point cloud is located is the z-axis, and the coordinate axis on which the longest side of the bounding box of the point cloud is located is the same as the normal axis of the patch, the y-axis is the tangent axis of the patch, and the x-axis is the bitangent axis of the patch.

It should be noted that during specific implementation, whether the mapping relationship among an index of a coordinate axis on which a longest side of a bounding box of a point cloud is located, an index of a normal axis of a patch, an index of a tangent axis of the patch, and an index of a bitangent axis of the patch is Table 6 or a new table including a mapping relationship among these indexes that corresponds to an alternative solution of Table 6 may be predefined, for example, predefined according to a protocol.

Solution 4.

When a normal axis of a patch is different from a coordinate axis on which a longest side of a bounding box of a point cloud including the patch is located, the coordinate axis on which the longest side of the bounding box of the point cloud is located is a tangent axis of the patch. In this case, a coordinate axis perpendicular to both the normal axis of the patch and the tangent axis of the patch is a bitangent axis of the patch.

When a normal axis of a patch is the same as a coordinate axis on which a longest side of a bounding box of a point cloud including the patch is located, one of a coordinate axis on which a second longest side of the bounding box of the point cloud is located and a coordinate axis on which a shortest side of the bounding box of the point cloud is located is a bitangent axis of the patch, and the other is a tangent axis of the patch. Specifically, when the normal axis of the patch is the same as the coordinate axis on which the longest side of the bounding box of the point cloud including the patch is located, the coordinate axis on which the second longest side of the bounding box of the point cloud is located may be the tangent axis of the patch, and the coordinate axis on which the shortest side of the bounding box of the point cloud is located is the bitangent axis of the patch, or the coordinate axis on which the shortest side of the bounding box of the point cloud is located may be the tangent axis of the patch, and the coordinate axis on which the second longest side of the bounding box of the point cloud is located is the bitangent axis of the patch.

Based on the solution 4, a "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided in this embodiment of this application may be shown in Table 7.

TABLE 7

| Index of a coordinate axis on which a longest side of a bounding box of a point cloud is located | Index of a normal axis of a patch | Index of a tangent axis of the patch | Index of a bitangent axis of the patch |
|---|---|---|---|
| 0 | 0 | 2 | 1 |
|   | 1 | 0 | 2 |
|   | 2 | 0 | 1 |
| 1 | 0 | 1 | 2 |
|   | 1 | 2 | 0 |
|   | 2 | 1 | 0 |
| 2 | 0 | 2 | 1 |
|   | 1 | 2 | 0 |
|   | 2 | 1 | 0 |

For example, referring to Table 7, it can be learned that when an index of a coordinate axis on which a longest side of a bounding box of a point cloud is located is 0, if an index of a normal axis of a patch is 2, an index of a tangent axis of the patch is 0, and an index of a bitangent axis of the patch is 1. With reference to Table 1, it can be learned that this example is specifically as follows. When the coordinate axis on which the longest side of the bounding box of the point cloud is located is the x-axis, if the normal axis of the patch is the z-axis, the tangent axis of the patch is the x-axis, and the bitangent axis of the patch is the y-axis. A principle of another example is similar to that described herein, and no more examples are enumerated.

Table 7 shows merely an example of the "mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch" provided based on the solution 4. Alternatively, when the coordinate axis on which the longest side of the bounding box of the point cloud is located is the x-axis, and the coordinate axis on which the longest side of the bounding box of the point cloud is located is the same as the normal axis of the patch, the y-axis is the tangent axis of the patch, and the z-axis is the bitangent axis of the patch. Alternatively, when the coordinate axis on which the longest side of the bounding box of the point cloud is located is the y-axis, and the coordinate axis on which the longest side of the bounding box of the point cloud is located is the same as the normal axis of the patch, the x-axis is the tangent axis of the patch, and the z-axis is the bitangent axis of the patch. Alternatively, when the coordinate axis on which the longest side of the bounding box of the point cloud is located is the z-axis, and the coordinate axis on which the longest side of the bounding box of the point cloud is located is the same as the normal axis of the patch, the x-axis is the tangent axis of the patch, and the y-axis is the bitangent axis of the patch.

It should be noted that during specific implementation, whether the mapping relationship among an index of a coordinate axis on which a longest side of a bounding box of a point cloud is located, an index of a normal axis of a patch, an index of a tangent axis of the patch, and an index of a bitangent axis of the patch is Table 7 or a new table including a mapping relationship among these indexes that corresponds to an alternative solution of Table 7 may be predefined, for example, predefined according to a protocol.

Optionally, S102 may be implemented in one of the following manners.

Manner 1. S102 may include the following step S102-A.

S102-A. Determine, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-encoded point cloud and the normal axis of the to-be-encoded patch, where the determined target tangent axis is the tangent axis of the to-be-encoded patch, and the determined target bitangent axis is the bitangent axis of the to-be-encoded patch.

The manner 1 may be replaced with the following step S102-B.

S102-B. Determine, based on a mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch, an index of a target tangent axis and an index of a target bitangent axis that correspond to both the index of the description information of the bounding box size of the to-be-encoded point cloud and the index of the normal axis of the to-be-encoded patch. The determined index of the target tangent axis is the index of the tangent axis of the to-be-encoded patch, and the determined index of the target bitangent axis is the index of the bitangent axis of the to-be-encoded patch.

Specifically, when the description information of the bounding box size of the point cloud includes the size relationship among the side lengths of the bounding box of the point cloud, the mapping relationship may be shown in Table 4 or Table 5. When the description information of the bounding box size of the point cloud includes the coordinate axis on which the longest side of the bounding box of the point cloud is located, the mapping relationship may be shown in Table 6 or Table 7.

In an example, referring to any one of Table 4 to Table 7, an index of each type of description information of a bounding box size of a point cloud corresponds to three combinations of "an index of a tangent axis and an index of a bitangent axis", and each combination of "an index of a tangent axis and an index of a bitangent axis" corresponds to an index of one normal axis. For example, referring to Table 4, it can be learned that if the index of the description information of the bounding box size of the to-be-encoded point cloud is 0, and the index of the normal axis of the patch is 0, the index of the tangent axis of the patch is 2, and the index of the bitangent axis is 1. In an embodiment, if the description information of the bounding box size of the to-be-encoded point cloud is Bx≥By≥Bz, and the normal axis of the patch is the x-axis, the tangent axis of the patch is the z-axis, and the bitangent axis is the y-axis. A principle of another example is similar to that described herein, and no more examples are enumerated.

Manner 2. S102 may include the following steps S102-C1 and S102-C2.

S102-C1. Determine, based on a mapping relationship between a plurality of types of description information of bounding box sizes of point clouds and a plurality of tangent mode sets, a target tangent mode set corresponding to the description information of the bounding box size of the to-be-encoded point cloud, where each tangent mode set includes at least two tangent modes, and each tangent mode includes one tangent axis and one bitangent axis.

S102-C2. Determine, based on a mapping relationship between a plurality of types of normal axes of a patch and a plurality of tangent modes in the target tangent mode set, a target tangent mode corresponding to the normal axis of the to-be-encoded patch, where a tangent axis included in the determined target tangent mode is the tangent axis of the to-be-encoded patch, and a bitangent axis included in the determined target tangent mode is the bitangent axis of the to-be-encoded patch.

The description information of the bounding box size of the point cloud may be in a one-to-one correspondence with the tangent mode sets. The point cloud herein is a generalized point cloud. The plurality of types of normal axes of the patch may be in a one-to-one correspondence with the plurality of tangent modes in the target tangent mode set. The patch herein is a generalized patch. Because the normal axis of the patch may be the x-axis, the y-axis, or the z-axis, there may be three types of normal axes of the patch. In other words, each tangent mode set may include three tangent modes.

The manner 2 may be replaced with the following steps S102-D1 and S102-D2.

S102-D1. Determine, based on a mapping relationship between indexes of a plurality of types of description information of bounding box sizes of point clouds and a plurality of tangent mode sets, a target tangent mode set corresponding to the index of the description information of the bounding box size of the to-be-encoded point cloud, where each tangent mode set includes at least two tangent modes, and each tangent mode includes an index of one tangent axis and an index of one bitangent axis.

S102-D2. Determine, based on a mapping relationship between indexes of a plurality of types of normal axes of a patch and indexes of a plurality of tangent modes in the target tangent mode set, a target tangent mode corresponding to the index of the normal axis of the to-be-encoded patch, where an index of a tangent axis included in the determined target tangent mode is the index of the tangent axis of the to-be-encoded patch, and an index of a bitangent axis included in the determined target tangent mode is the index of the bitangent axis of the to-be-encoded patch.

Specifically, when the description information of the bounding box size of the point cloud includes the size relationship among the side lengths of the bounding box of the point cloud, the mapping relationship between indexes of a plurality of types of description information of bounding box sizes of point clouds and a plurality of tangent mode sets and the mapping relationship between indexes of a plurality of types of normal axes of a patch and indexes of a plurality of tangent modes in the target tangent mode set may be shown in Table 4 or Table 5. When the description information of the bounding box size of the point cloud includes the coordinate axis on which the longest side of the bounding box of the point cloud is located, the two mapping relationships may be shown in Table 6 or Table 7.

In an example, referring to any one of Table 4 to Table 7, a combination of "an index of a tangent axis of a patch and an index of a bitangent axis of the patch" included in each row of the last two columns of the table represents one tangent mode. Each tangent mode corresponds to an index of one normal axis. Three tangent modes corresponding to an index of each type of description information of a bounding box size of a point cloud represent a tangent mode set corresponding to the description information.

For example, referring to Table 4, if the index of the description information of the bounding box size of the to-be-encoded point cloud is 0, the target tangent mode set corresponding to the index of the description information of the bounding box size of the to-be-encoded point cloud includes the following tangent modes a tangent mode including "an index 2 of a tangent axis of a patch and an index 1 of a bitangent axis of the patch", a tangent mode including "an index 2 of a tangent axis of a patch and an index 0 of a bitangent axis of the patch", and a tangent mode including "an index 1 of a tangent axis of a patch and an index 0 of a bitangent axis of the patch". In this case, if the index of the normal axis of the to-be-encoded patch is 0, the tangent mode corresponding to the to-be-encoded patch is the tangent mode including "an index 2 of a tangent axis of a patch and an index 1 of a bitangent axis of the patch". A principle of another example is similar to that described herein, and no more examples are enumerated.

Manner 3. S102 may include the following step S102-E.

S102-E. Determine the tangent axis of the to-be-encoded patch and the bitangent axis of the to-be-encoded patch according to a projection rule (or referred to as a projection rule for projecting the to-be-encoded point cloud) based on the description information of the bounding box size of the to-be-encoded point cloud and the normal axis of the to-be-encoded patch, where the projection rule refers to distribution, on a two-dimensional plane, of a projected picture obtained by projecting a patch in the to-be-encoded point cloud onto the two-dimensional plane. The two-dimensional plane is a plane on which the tangent axis and the bitangent axis of the to-be-encoded patch are located.

It may be understood that, for a specific implementation of determining the tangent axis of the to-be-encoded patch and the bitangent axis of the to-be-encoded patch based on the description information of the bounding box size of the to-be-encoded point cloud and the normal axis of the to-be-encoded patch in the manner 3, refer to the manner 1 or the manner 2.

Optionally, the projection rule may include vertical projection or horizontal projection. The vertical projection refers to a rule in which projected pictures are vertically distributed when most patches in a point cloud are projected onto a two-dimensional plane. The horizontal projection refers to a rule in which projected pictures are horizontally distributed when most patches in a point cloud are projected onto a two-dimensional plane. It may be understood that, during specific implementation, the encoder may not need to first determine a specific quantity of the "most patches" herein before determining whether the projection rule for projecting the to-be-encoded point cloud indicates horizontal projection or vertical projection. For example, the projection rule for projecting the to-be-encoded point cloud may be predefined, for example, predefined according to a protocol. For another example, the projection rule for projecting the to-be-encoded point cloud may be obtained according to a rate-distortion cost criterion. Certainly, this application is not limited thereto. For example, the projection rule for projecting the to-be-encoded point cloud is determined from a candidate projection rule set according to the rate-distortion cost criterion. The candidate projection rule set may include at least two preset projection rules, for example, may include horizontal projection and vertical projection.

Optionally, if the projection rule for projecting the to-be-encoded point cloud is not predefined, after obtaining the projection rule for projecting the to-be-encoded point cloud, the encoder may encode, into the bitstream, information used to indicate the projection rule, to notify the decoder of the projection rule. It may be understood that the information used to indicate the projection rule is frame level-based information. Therefore, with reference to FIG. 3, if the to-be-encoded point cloud is the first frame of point cloud in a GOF, the information used to indicate the projection rule may be encoded into the field 1103 in the bitstream.

Figure 11A:
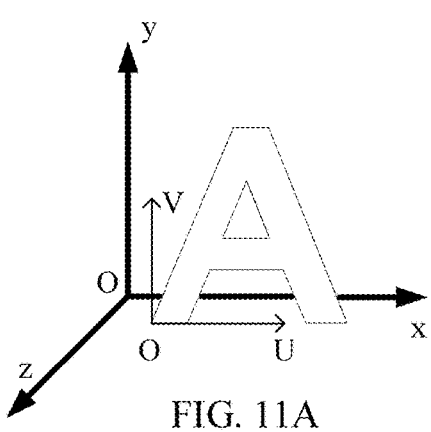
FIG. 11A to FIG. 11C are a schematic diagram of projection of a patch from three-dimensional space to a two-dimensional plane according to an embodiment of this application.
Figure 11B:
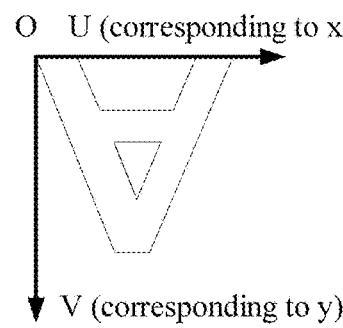
Figure 11C:
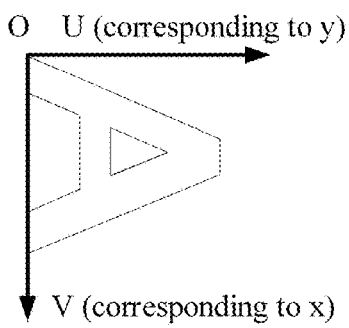

FIG. 11A to FIG. 11C are a schematic diagram of projection of a patch from three-dimensional space to a two-dimensional plane according to an embodiment of this application. In FIG. 11A to FIG. 11C, an origin of coordinates is denoted as O. It is assumed that a letter A shown in FIG. 11A is a patch in the three-dimensional space, and a normal axis of the patch is the z-axis. In addition, it is assumed that on the two-dimensional plane, a tangent direction of the patch is a horizontal axis (that is, a U-axis), and a bitangent direction of the patch is a vertical axis (that is, a V-axis). In this case, when a tangent axis of the patch is the x-axis and a bitangent axis of the patch is the y-axis, that is, when the U-axis is the x-axis and the V-axis is the y-axis, after the patch shown in FIG. 11A is projected onto the two-dimensional plane, a projected picture shown in FIG. 11B is obtained. When a tangent axis of the patch is the y-axis and a bitangent axis of the patch is the x-axis, that is, when the U-axis is the y-axis and the V-axis is the x-axis, after the patch shown in FIG. 11A is projected onto the two-dimensional plane, a projected picture shown in FIG. 11C is obtained. It may be understood that the projected picture shown in FIG. 11B is vertically distributed, and the projected picture shown in FIG. 11C is horizontally distributed.

In an example, if the description information of the bounding box size of the point cloud includes the size relationship among the side lengths of the bounding box of the point cloud, when the projection rule for projecting the to-be-encoded point cloud indicates vertical projection, a mapping relationship among description information of a bounding box size of a point cloud, a normal axis of a patch, a tangent axis of the patch, and a bitangent axis of the patch may be the foregoing solution 1. In this case, the encoder may obtain the tangent axis and the bitangent axis of the to-be-encoded patch by searching Table 4. When the projection rule for projecting the to-be-encoded point cloud indicates horizontal projection, a mapping relationship among description information of a bounding box size of a point cloud, a normal axis of a patch, a tangent axis of the patch, and a bitangent axis of the patch may be the foregoing solution 2. In this case, the encoder may obtain the tangent axis and the bitangent axis of the to-be-encoded patch by searching Table 5.

In an example, if the description information of the bounding box size of the point cloud includes the coordinate axis on which the longest side of the bounding box of the point cloud is located, when the projection rule for projecting the to-be-encoded point cloud indicates vertical projection, a mapping relationship among description information of a bounding box size of a point cloud, a normal axis of a patch, a tangent axis of the patch, and a bitangent axis of the patch may be the foregoing solution 3. In this case, the encoder may obtain the tangent axis and the bitangent axis of the to-be-encoded patch by searching Table 6. When the projection rule for projecting the to-be-encoded point cloud indicates horizontal projection, a mapping relationship among description information of a bounding box size of a point cloud, a normal axis of a patch, a tangent axis of the patch, and a bitangent axis of the patch may be the foregoing solution 4. In this case, the encoder may obtain the tangent axis and the bitangent axis of the to-be-encoded patch by searching Table 7.

An example in which the projection rule includes vertical projection and horizontal projection is used above for description. Further, the projection rule may include another projection rule. In this case, the encoder may predefine (for example, according to a protocol) a correspondence between each projection rule and a "mapping relationship among description information of a bounding box size of a point cloud, a normal axis of a patch, a tangent axis of the patch, and a bitangent axis of the patch". Therefore, after a specific projection rule for projecting the to-be-encoded point cloud is determined, the "mapping relationship among description information of a bounding box size of a point cloud, a normal axis of a patch, a tangent axis of the patch, and a bitangent axis of the patch" used for determining the tangent axis and the bitangent axis of the to-be-encoded patch may be obtained.

The following describes specific implementations of the information used to indicate the description information of the bounding box size of the to-be-encoded point cloud. For example, the information used to indicate the description information of the bounding box size of the to-be-encoded point cloud may include any one of the following information 1 to 7.

Information 1 is size information of a bounding box of the to-be-encoded point cloud. The size information of the bounding box of the to-be-encoded point cloud may include the bounding box size Bx, By, and Bz of the to-be-encoded point cloud. For example, if Bx=10 centimeters (cm), By=8 cm, and Bz=5 cm, the information used to indicate the description information of the bounding box size of the to-be-encoded point cloud may include Bx=10 cm, By=8 cm, and Bz=5 cm.

Information 2 is an index of a coordinate axis on which a longest side of a bounding box of the to-be-encoded point cloud is located. For example, if Bx=10 cm, By=8 cm, and Bz=5 cm, the information used to indicate the description information of the bounding box size of the to-be-encoded point cloud may include an index "0" of a coordinate axis (that is, the x-axis) on which a longest side (that is, Bx) of the bounding box of the to-be-encoded point cloud is located.

Information 3 is an index of a size relationship among side lengths of a bounding box of the to-be-encoded point cloud. For example, if Bx=10 cm, By=8 cm, and Bz=5 cm, referring to Table 2, it can be learned that the information used to indicate the description information of the bounding box size of the to-be-encoded point cloud may include an index "0" of a size relationship (that is, Bx>By>Bz) among the side lengths of the bounding box of the to-be-encoded point cloud.

Information 4 is an index of a coordinate axis on which a longest side of a bounding box of the to-be-encoded point cloud is located and an index of a coordinate axis on which a second longest side of the bounding box of the to-be-encoded point cloud is located.

Information 5 is an index of a coordinate axis on which a longest side of a bounding box of the to-be-encoded point cloud is located and an index of a coordinate axis on which a shortest side of the bounding box of the to-be-encoded point cloud is located.

Information 6 is an index of a coordinate axis on which a second longest side of a bounding box of the to-be-encoded point cloud is located and an index of a coordinate axis on which a shortest side of the bounding box of the to-be-encoded point cloud is located.

Information 7 is an index of a coordinate axis on which a longest side of a bounding box of the to-be-encoded point cloud is located, an index of a coordinate axis on which a second longest side of the bounding box of the to-be-encoded point cloud is located, and an index of a coordinate axis on which a shortest side of the bounding box of the to-be-encoded point cloud is located.

When the description information of the bounding box size of the to-be-encoded point cloud includes the size relationship among the side lengths of the bounding box of the to-be-encoded point cloud, the information used to indicate the description information of the bounding box size of the to-be-encoded point cloud may be implemented by using any one of the foregoing information 1 and information 3 to information 7. It may be understood that the decoder may obtain a size relationship among Bx, By, and Bz by using any one of the information 1 and the information 4 to the information 7, or may obtain a size relationship among Bx, By, and Bz by using the information 3 with reference to Table 2.

When the description information of the bounding box size of the to-be-encoded point cloud includes the coordinate axis on which the longest side of the bounding box of the to-be-encoded point cloud is located, the information used to indicate the description information of the bounding box size of the to-be-encoded point cloud may be implemented by using the foregoing information 1 or information 2.

It may be understood that, during specific implementation, which one of the foregoing information 1 to 7 is included in the information used to indicate the description information of the bounding box size of the to-be-encoded point cloud may be predefined (for example, predefined according to a protocol). Certainly, this application is not limited thereto. For example, if it is pre-agreed on that the foregoing information 4 is used as the information used to indicate the description information of the bounding box size of the to-be-encoded point cloud, an optional implementation may be that the bitstream includes a field 1 and a field 2, the field 1 is used to indicate the index of the coordinate axis on which the longest side of the bounding box of the to-be-encoded point cloud is located, and the field 2 is used to indicate the index of the coordinate axis on which the second longest side of the bounding box of the to-be-encoded point cloud is located. In addition, locations of the two fields in the bitstream and a quantity of bits occupied by each field are pre-agreed on by the encoder and the decoder. In this case, if Bx=10 cm, By=8 cm, and Bz=5 cm, the information used to indicate the description information of the bounding box size of the to-be-encoded point cloud includes the field 1 carrying an index 0 of the coordinate axis on which the longest side (that is, Bx) of the bounding box of the to-be-encoded point cloud is located and the field 2 carrying an index 1 of the coordinate axis on which the second longest side (that is, By) of the bounding box of the to-be-encoded point cloud is located. Specific examples of the information 5 to information 7 are similar to that described herein, and are not enumerated one by one herein.

Figure 12:
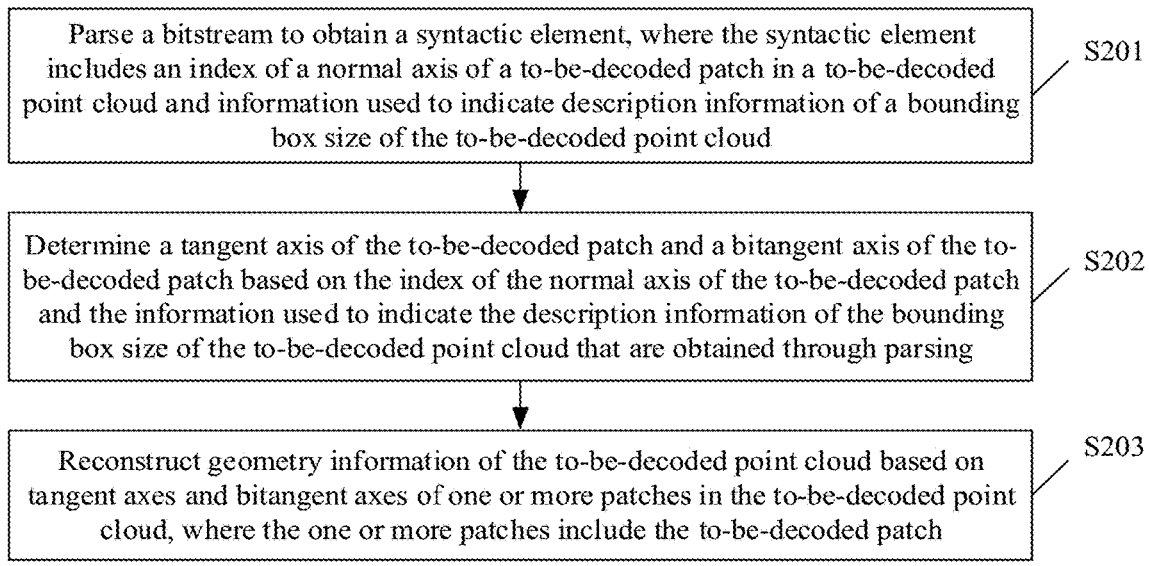
FIG. 12 is a schematic flowchart of a point cloud decoding method according to an embodiment of this application.

FIG. 12 is a schematic flowchart of a point cloud decoding method according to an embodiment of this application. The point cloud encoding method corresponds to the point cloud decoding method. Therefore, for explanations of related content in this embodiment, refer to the foregoing embodiment of the point cloud encoding method. For example, with reference to the point cloud coding system shown in FIG. 1, this embodiment may be specifically performed by the destination apparatus 20 in the point cloud coding system, and more specifically, may be performed by the decoder 200 in the destination apparatus 20. The method shown in FIG. 12 may include the following steps.

S201. Parse a bitstream to obtain a syntax element. The syntax element includes an index of a normal axis of a to-be-decoded patch in a to-be-decoded point cloud and information used to indicate description information of a bounding box size of the to-be-decoded point cloud.

The to-be-decoded point cloud may be a point cloud transmitted by an encoder to the decoder after the encoder encodes the foregoing to-be-encoded point cloud. Referring to FIG. 3, if the to-be-decoded point cloud is the first frame of point cloud in a GOF, S201 may specifically include parsing a field 1102 to obtain the information used to indicate the description information of the bounding box size of the to-be-decoded point cloud, and parsing a field 1103 to obtain the index of the normal axis of the to-be-decoded patch. Because the information used to indicate the description information of the bounding box size of the to-be-decoded point cloud is frame level-based information, and the index of the normal axis of the to-be-decoded patch is patch level-based information, the decoder may parse the two pieces of information at different times.

The description information of the bounding box size of the to-be-decoded point cloud may include a size relationship among side lengths of a bounding box of the to-be-decoded point cloud, a coordinate axis on which a longest side of a bounding box of the to-be-decoded point cloud is located, or the like. During specific implementation, whether the description information of the bounding box size of the to-be-decoded point cloud includes the size relationship among the side lengths of the bounding box of the to-be-decoded point cloud or the coordinate axis on which the longest side of the bounding box of the to-be-decoded point cloud is located may be predefined (for example, predefined according to a protocol), or may be determined by parsing indication information carried in the bitstream. It may be understood that the indication information is frame level-based information.

Optionally, the information used to indicate the description information of the bounding box size of the to-be-decoded point cloud may include one of the following information. Information 8 is size information of the bounding box of the to-be-decoded point cloud. Information 9 is an index of the coordinate axis on which the longest side of the bounding box of the to-be-decoded point cloud is located. Information 10 is an index of the size relationship among the side lengths of the bounding box of the to-be-decoded point cloud. Information 11 is an index of the coordinate axis on which the longest side of the bounding box of the to-be-decoded point cloud is located and an index of a coordinate axis on which a second longest side of the bounding box of the to-be-decoded point cloud is located. Information 12 is an index of the coordinate axis on which the longest side of the bounding box of the to-be-decoded point cloud is located and an index of a coordinate axis on which a shortest side of the bounding box of the to-be-decoded point cloud is located. Information 13 is an index of a coordinate axis on which a second longest side of the bounding box of the to-be-decoded point cloud is located and an index of a coordinate axis on which a shortest side of the bounding box of the to-be-decoded point cloud is located. Information 14 is an index of the coordinate axis on which the longest side of the bounding box of the to-be-decoded point cloud is located, an index of a coordinate axis on which a second longest side of the bounding box of the to-be-decoded point cloud is located, and an index of a coordinate axis on which a shortest side of the bounding box of the to-be-decoded point cloud is located.

Specifically, when the description information of the bounding box size of the to-be-decoded point cloud includes the size relationship among the side lengths of the bounding box of the to-be-decoded point cloud, the information used to indicate the description information of the bounding box size of the to-be-decoded point cloud may include any one of the information 8 and information 10 to information 14. When the description information of the bounding box size of the to-be-decoded point cloud includes the coordinate axis on which the longest side of the bounding box of the to-be-decoded point cloud is located, the information used to indicate the description information of the bounding box size of the to-be-decoded point cloud may include either of the information 8 and information 9.

Optionally, the decoder may determine the description information of the bounding box size of the to-be-decoded point cloud (or the index of the description information) based on specific information that is used to indicate the description information of the bounding box size of the to-be-decoded point cloud and that is carried in a preset field (such as the field 1102) in the bitstream that is predefined (for example, predefined according to a protocol).

S202. Determine a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing.

Optionally, the decoder may predefine, for example, according to a protocol, a mapping relationship among a plurality of types of description information of bounding box sizes of point clouds (or indexes of the plurality of types of description information), a plurality of types of normal axes of a patch (or indexes of the plurality of types of normal axes), a plurality of types of tangent axes of the patch (or indexes of the plurality of types of tangent axes), and a plurality of types of bitangent axes of the patch (or indexes of the plurality of types of bitangent axes). Then, after the index of the normal axis of the to-be-decoded patch and the information used to indicate the description information of the bounding box size of the to-be-decoded point cloud are obtained by parsing the bitstream, the tangent axis of the to-be-decoded patch (or an index of the tangent axis of the to-be-decoded patch) and the bitangent axis of the to-be-decoded patch (or an index of the bitangent axis of the to-be-decoded patch) are obtained according to the mapping relationship.

If the decoder predefines the mapping relationship in a form of a table (certainly, this application is not limited thereto), the table may be a mapping relationship shown in any one of Table 4 to Table 7. Based on this, the decoder may obtain the tangent axis of the to-be-decoded patch and the bitangent axis of the to-be-decoded patch by searching the table.

S203. Reconstruct geometry information of the to-be-decoded point cloud based on tangent axes and bitangent axes of one or more patches in the to-be-decoded point cloud, where the one or more patches include the to-be-decoded patch.

The point cloud decoding method corresponds to the point cloud encoding method provided above. Therefore, for beneficial effects that can be achieved according to the point cloud decoding method, refer to the foregoing analysis of the beneficial effects that can be achieved according to the point cloud encoding method. Details are not described herein again.

Optionally, S202 may be implemented in one of the following manners.

Manner 1. S202 may include the following step S202-A.

S202-A. Determine, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-decoded point cloud and the normal axis of the to-be-decoded patch, where the determined target tangent axis is the tangent axis of the to-be-decoded patch, and the determined target bitangent axis is the bitangent axis of the to-be-decoded patch.

The manner 1 may be replaced with the following step S202-B.

S202-B. Determine, based on a mapping relationship among indexes of a plurality of types of description information of bounding box sizes of point clouds, indexes of a plurality of types of normal axes of a patch, indexes of a plurality of types of tangent axes of the patch, and indexes of a plurality of types of bitangent axes of the patch, an index of a target tangent axis and an index of a target bitangent axis that correspond to both the index of the description information of the bounding box size of the to-be-decoded point cloud and the index of the normal axis of the to-be-decoded patch. The determined index of the target tangent axis is the index of the tangent axis of the to-be-decoded patch, and the determined index of the target bitangent axis is the index of the bitangent axis of the to-be-decoded patch.

Specifically, when the description information of the bounding box size of the point cloud includes the size relationship among the side lengths of the bounding box of the point cloud, the mapping relationship may be shown in Table 4 or Table 5. When the description information of the bounding box size of the point cloud includes the coordinate axis on which the longest side of the bounding box of the point cloud is located, the mapping relationship may be shown in Table 6 or Table 7.

In an example, referring to any one of Table 4 to Table 7, an index of each type of description information of a bounding box size of a point cloud corresponds to three combinations of "an index of a tangent axis and an index of a bitangent axis", and each combination of "an index of a tangent axis and an index of a bitangent axis" corresponds to an index of one normal axis. For example, referring to Table 4, it can be learned that if the index of the description information of the bounding box size of the to-be-decoded point cloud is 0, and the index of the normal axis of the patch is 0, the index of the tangent axis of the patch is 2, and the index of the bitangent axis is 1. In an embodiment, the tangent axis of the patch is the z-axis, and the bitangent axis of the patch is the y-axis. A principle of another example is similar to that described herein, and no more examples are enumerated.

Manner 2. S202 may include the following steps S202-C1 and S202-C2.

S202-C1. Determine, based on a mapping relationship between a plurality of types of description information of bounding box sizes of point clouds and a plurality of tangent mode sets, a target tangent mode set corresponding to the description information of the bounding box size of the to-be-decoded point cloud, where each tangent mode set includes at least two tangent modes, and each tangent mode includes one tangent axis and one bitangent axis.

S202-C2. Determine, based on a mapping relationship between a plurality of types of normal axes of a patch and a plurality of tangent modes in the target tangent mode set, a target tangent mode corresponding to the normal axis of the to-be-decoded patch, where a tangent axis included in the determined target tangent mode is the tangent axis of the to-be-decoded patch, and a bitangent axis included in the determined target tangent mode is the bitangent axis of the to-be-decoded patch.

The manner 2 may be replaced with the following steps S202-D1 and S202-D2.

S202-D1. Determine, based on a mapping relationship between indexes of a plurality of types of description information of bounding box sizes of point clouds and a plurality of tangent mode sets, a target tangent mode set corresponding to the index of the description information of the bounding box size of the to-be-decoded point cloud, where each tangent mode set includes at least two tangent modes, and each tangent mode includes an index of one tangent axis and an index of one bitangent axis.

S202-D2. Determine, based on a mapping relationship between indexes of a plurality of types of normal axes of a patch and a plurality of tangent modes in the target tangent mode set, a target tangent mode corresponding to the index of the normal axis of the to-be-decoded patch, where an index of a tangent axis included in the determined target tangent mode is the index of the tangent axis of the to-be-decoded patch, and an index of a bitangent axis included in the determined target tangent mode is the index of the bitangent axis of the to-be-decoded patch.

For specific implementations and related descriptions of the mapping relationship between indexes of a plurality of types of description information of bounding box sizes of point clouds and a plurality of tangent mode sets and the mapping relationship between indexes of a plurality of types of normal axes of a patch and a plurality of tangent modes in the target tangent mode set, refer to the foregoing descriptions.

For example, referring to Table 4, if the index of the description information of the bounding box size of the to-be-decoded point cloud is 0, the target tangent mode set corresponding to the index of the description information of the bounding box size of the to-be-decoded point cloud includes the following tangent modes a tangent mode including "an index 2 of a tangent axis of a patch and an index 1 of a bitangent axis of the patch", a tangent mode including "an index 2 of a tangent axis of a patch and an index 0 of a bitangent axis of the patch", and a tangent mode including "an index 1 of a tangent axis of a patch and an index 0 of a bitangent axis of the patch". In this case, if the index of the normal axis of the to-be-decoded patch is 0, the tangent mode corresponding to the to-be-decoded patch is the tangent mode including "an index 2 of a tangent axis of a patch and an index 1 of a bitangent axis of the patch". A principle of another example is similar to that described herein, and no more examples are enumerated.

Manner 3. S202 may include the following step S202-E.

S202-E. Determine the tangent axis of the to-be-decoded patch and the bitangent axis of the to-be-decoded patch according to a projection rule (or referred to as a projection rule for projecting the to-be-decoded point cloud) based on the description information of the bounding box size of the to-be-decoded point cloud and the normal axis of the to-be-decoded patch, where the projection rule refers to distribution, on a two-dimensional plane, of a projected picture obtained by projecting a patch in the to-be-decoded point cloud onto the two-dimensional plane. The two-dimensional plane is a plane on which the tangent axis and the bitangent axis of the to-be-decoded patch are located.

Optionally, the projection rule may include vertical projection or horizontal projection.

In an example, the projection rule for projecting the to-be-decoded point cloud may be predefined, for example, predefined according to a protocol.

In an example, the projection rule for projecting the to-be-decoded point cloud may be obtained by the decoder by parsing the bitstream. The syntax element obtained by parsing the bitstream includes information used to indicate the projection rule for projecting the to-be-decoded point cloud. The information used to indicate the projection rule for projecting the to-be-decoded point cloud is frame level-based information. A specific type of the information used to indicate the projection rule for projecting the to-be-decoded point cloud is not limited in this embodiment of this application. For example, the information may be an index of the projection rule. For example, if the projection rule indicates vertical projection, the index of the projection rule may be 0. If the projection rule indicates horizontal projection, the index of the projection rule may be 1. Certainly, this application is not limited thereto.

In an example, if the description information of the bounding box size of the point cloud includes the size relationship among the side lengths of the bounding box of the point cloud, when the projection rule for projecting the to-be-decoded point cloud indicates vertical projection, a mapping relationship among description information of a bounding box size of a point cloud, a normal axis of a patch, a tangent axis of the patch, and a bitangent axis of the patch may be the foregoing solution 1. In this case, the decoder may obtain the tangent axis and the bitangent axis of the to-be-decoded patch by searching Table 4. When the projection rule for projecting the to-be-decoded point cloud indicates horizontal projection, a mapping relationship among description information of a bounding box size of a point cloud, a normal axis of a patch, a tangent axis of the patch, and a bitangent axis of the patch may be the foregoing solution 2. In this case, the decoder may obtain the tangent axis and the bitangent axis of the to-be-decoded patch by searching Table 5.

In an example, if the description information of the bounding box size of the point cloud includes the coordinate axis on which the longest side of the bounding box of the point cloud is located, when the projection rule for projecting the to-be-decoded point cloud indicates vertical projection, a mapping relationship among description information of a bounding box size of a point cloud, a normal axis of a patch, a tangent axis of the patch, and a bitangent axis of the patch may be the foregoing solution 3. In this case, the decoder may obtain the tangent axis and the bitangent axis of the to-be-decoded patch by searching Table 6. When the projection rule for projecting the to-be-decoded point cloud indicates horizontal projection, a mapping relationship among description information of a bounding box size of a point cloud, a normal axis of a patch, a tangent axis of the patch, and a bitangent axis of the patch may be the foregoing solution 4. In this case, the decoder may obtain the tangent axis and the bitangent axis of the to-be-decoded patch by searching Table 7.

It may be understood that, when the description information of the bounding box size of the to-be-decoded point cloud includes the size relationship among the side lengths of the bounding box of the to-be-decoded point cloud, and the information used to indicate the description information of the bounding box size of the to-be-decoded point cloud includes the index of the size relationship among the side lengths of the bounding box of the to-be-decoded point cloud, or when the description information of the bounding box size of the to-be-decoded point cloud includes the coordinate axis on which the longest side of the bounding box of the to-be-decoded point cloud is located, and the information used to indicate the description information of the bounding box size of the to-be-decoded point cloud includes the index of the coordinate axis on which the longest side of the bounding box of the to-be-decoded point cloud is located, optionally, S202 may be implemented by using any one of the manner 1 to the manner 3 provided above or an alternative manner of the manner.

It may be understood that, when the description information of the bounding box size of the to-be-decoded point cloud includes the size relationship among the side lengths of the bounding box of the to-be-decoded point cloud, if the information used to indicate the description information of the bounding box size of the to-be-decoded point cloud includes the size information of the bounding box of the to-be-decoded point cloud, the method may further include obtaining the size relationship among the side lengths of the bounding box of the to-be-decoded point cloud based on the size information of the bounding box of the to-be-decoded point cloud. Then, optionally, S202 may be implemented by using any one of the manner 1 to the manner 3 provided above or an alternative manner of the manner.

It may be understood that, when the description information of the bounding box size of the to-be-decoded point cloud includes the coordinate axis on which the longest side of the bounding box of the to-be-decoded point cloud is located, if the information used to indicate the description information of the bounding box size of the to-be-decoded point cloud includes the size information of the bounding box of the to-be-decoded point cloud, the method may further include obtaining, based on the size information of the bounding box of the to-be-decoded point cloud, the coordinate axis on which the longest side of the bounding box of the to-be-decoded point cloud is located. Then, optionally, S202 may be implemented by using any one of the manner 1 to the manner 3 provided above or an alternative manner of the manner.

Figure 13:
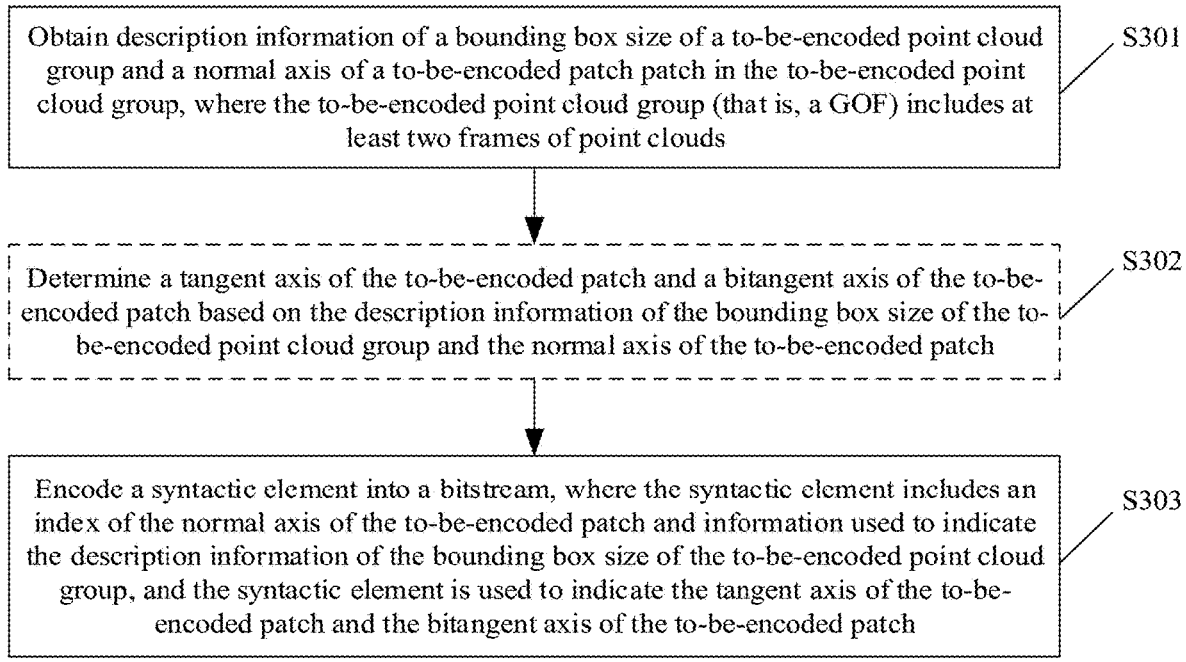
FIG. 13 is a schematic flowchart of another point cloud encoding method according to an embodiment of this application.

FIG. 13 is a schematic flowchart of another point cloud encoding method according to an embodiment of this application. For explanations of related content in this embodiment, refer to the foregoing descriptions. The method shown in FIG. 13 may include the following steps.

S301. Obtain description information of a bounding box size of a to-be-encoded point cloud group and a normal axis of a to-be-encoded patch in the to-be-encoded point cloud group, where the to-be-encoded point cloud group (that is, a GOF) includes at least two frames of point clouds. The to-be-encoded point cloud group may be any point cloud group that has an encoding requirement.

A specific implementation of using specific point clouds as a point cloud group is not limited in this embodiment of this application. For example, reference may be made to other approaches. For example, 32 consecutive frames of point clouds may be used as a point cloud group.

Description information of a bounding box size of a point cloud group may include a size relationship among side lengths of a bounding box of the point cloud group, a coordinate axis on which a longest side of a bounding box of the point cloud group is located, or the like.

Optionally, the description information of the bounding box size of the point cloud group may be description information of a bounding box size of one frame of point cloud (for example, the first frame of point cloud) in the point cloud group.

Optionally, the description information of the bounding box size of the point cloud group may be obtained by collecting statistics on description information of bounding box sizes of some or all point clouds in the point cloud group. For example, description information with a highest appearance frequency in the description information of the bounding box sizes of the some or all point clouds in the point cloud group may be used as the description information of the bounding box size of the point cloud group. Details are as follows.

When the description information of the bounding box size of the point cloud group includes the size relationship among the side lengths of the bounding box of the point cloud group, the description information of the bounding box size of the point cloud group may be a size relationship with a highest appearance frequency in size relationships among side lengths of bounding boxes of some or all point clouds in the point cloud group. For example, referring to Table 2, a size relationship among side lengths of a bounding box of each point cloud may be one of the six possible cases shown in Table 2. If it is learned, by collecting statistics on the size relationship among the side lengths of the bounding box of each point cloud in the point cloud group, that $Bx \geq By \geq Bz$ has a highest appearance frequency in the six possible cases, $Bx \geq By \geq Bz$ is used as a size relationship among side lengths of a bounding box of the to-be-encoded point cloud group.

When the description information of the bounding box size of the point cloud group includes the coordinate axis on which the longest side of the bounding box of the point cloud group is located, the description information of the bounding box size of the point cloud group may be a coordinate axis with a highest appearance frequency in coordinate axes on which longest sides of bounding boxes of some or all point clouds in the point cloud group are located. For example, a coordinate axis on which a longest side of a bounding box of each point cloud is located may be one of the x-axis, the y-axis, and the z-axis. If it is learned, by collecting statistics on the coordinate axis on which the longest side of the bounding box of each point cloud in the point cloud group is located, that the x-axis has a highest appearance frequency, the x-axis is used as the description information of the bounding box size of the to-be-encoded point cloud group.

The description information of the bounding box size of the to-be-encoded point cloud group and the normal axis of the to-be-encoded patch are used to determine a tangent axis of the to-be-encoded patch and a bitangent axis of the to-be-encoded patch. For example, optionally, the tangent axis of the to-be-encoded patch and the bitangent axis of the to-be-encoded patch may be determined by performing the following step S302.

S302. Determine the tangent axis of the to-be-encoded patch and the bitangent axis of the to-be-encoded patch based on the description information of the bounding box size of the to-be-encoded point cloud group and the normal axis of the to-be-encoded patch.

In this embodiment, for all to-be-encoded patches in all frames of point clouds in the to-be-encoded point cloud group, an encoder uses description information of a same type to determine tangent axes of the to-be-encoded patches and bitangent axes of the to-be-encoded patches.

For example, a solution obtained after the "description information of the bounding box size of the point cloud" in the manner 1 (or an alternative solution of the manner 1) or the manner 2 (or an alternative solution of the manner 2) of S102 in the point cloud encoding method shown in FIG. 9 is replaced with the "description information of the bounding box size of the point cloud group" may be used as a specific implementation of S302 in this embodiment. Details are not described herein.

For example, a solution obtained after the "description information of the bounding box size of the point cloud" in the manner 3 of S102 in the point cloud encoding method shown in FIG. 9 is replaced with the "description information of the bounding box size of the point cloud group" and the "projection rule for projecting the to-be-encoded point cloud" is replaced with a "projection rule for projecting the to-be-encoded point cloud group" may be used as a specific implementation of S302 in this embodiment. Details are not described herein. It may be understood that the projection rule for projecting the to-be-encoded point cloud group is GOF level-based information. Therefore, if information used to indicate the projection rule for projecting the to-be-encoded point cloud group is to be encoded into a bitstream, with reference to the bitstream structure shown in FIG. 3, the encoder may encode the information into a field 1102.

For example, a mapping relationship obtained after the "description information of the bounding box size of the point cloud" in the foregoing solution 1 to solution 4 is replaced with the "description information of the bounding box size of the point cloud group" may be used as a "mapping relationship among description information of a bounding box size of a point cloud group, a normal axis of a patch, a tangent axis of the patch, and a bitangent axis of the patch" in this embodiment.

S303. Encode a syntax element into a bitstream, where the syntax element includes an index of the normal axis of the to-be-encoded patch and information used to indicate the description information of the bounding box size of the to-be-encoded point cloud group, and the syntax element is used to indicate the tangent axis of the to-be-encoded patch and the bitangent axis of the to-be-encoded patch.

The information used to indicate the description information of the bounding box size of the to-be-encoded point cloud group is GOF level-based information. Therefore, if the information is to be encoded into the bitstream, with reference to the bitstream structure shown in FIG. 3, the encoder may encode the information into the field 1102.

Optionally, the information used to indicate the description information of the bounding box size of the to-be-encoded point cloud group may include one of the following size information of a bounding box of the to-be-encoded point cloud group, an index of a coordinate axis on which a longest side of a bounding box of the to-be-encoded point cloud group is located, an index of a size relationship among side lengths of a bounding box of the to-be-encoded point cloud group, an index of a coordinate axis on which a longest side of a bounding box of the to-be-encoded point cloud group is located and an index of a coordinate axis on which a second longest side of the bounding box of the to-be-encoded point cloud group is located, an index of a coordinate axis on which a longest side of a bounding box of the to-be-encoded point cloud group is located and an index of a coordinate axis on which a shortest side of the bounding box of the to-be-encoded point cloud group is located, an index of a coordinate axis on which a second longest side of a bounding box of the to-be-encoded point cloud group is located and an index of a coordinate axis on which a shortest side of the bounding box of the to-be-encoded point cloud group is located, or an index of a coordinate axis on which a longest side of a bounding box of the to-be-encoded point cloud group is located, an index of a coordinate axis on which a second longest side of the bounding box of the to-be-encoded point cloud group is located, and an index of a coordinate axis on which a shortest side of the bounding box of the to-be-encoded point cloud group is located. The size information of the bounding box of the to-be-encoded point cloud group may be size information of a bounding box of one frame of point cloud in the to-be-encoded point cloud group, or may be size information with a highest appearance frequency in size information of bounding boxes of some or all point clouds in the to-be-encoded point cloud group. A principle of another method for determining the coordinate axis on which the second longest side of the bounding box of the to-be-encoded point cloud group is located and the coordinate axis on which the shortest side of the bounding box of the to-be-encoded point cloud group is located is similar to that described herein, and details are not described herein again.

A sequence of performing S302 and S303 is not limited in this embodiment of this application. For example, S302 may be performed before S303, or S303 may be performed before S302, or S302 and S303 may be performed at the same time.

Optionally, after S302 is performed and before S303 is performed, the method may further include projecting the to-be-encoded patch from a three-dimensional coordinate system to a two-dimensional coordinate system based on the tangent axis and the bitangent axis of the to-be-encoded patch. For subsequent steps to be performed by the encoder, refer to the foregoing description of the encoder shown in FIG. 2, but this is not limited.

For beneficial effects of the point cloud encoding method provided in this embodiment, refer to the beneficial effects of the point cloud encoding method provided above. In addition, it may be understood that, because encoding is performed based on the point cloud group in this application, compared with those in a technical solution of performing encoding based on a point cloud, encoding complexity can be reduced, and bit overheads of bitstream transmission can be reduced.

Figure 14:
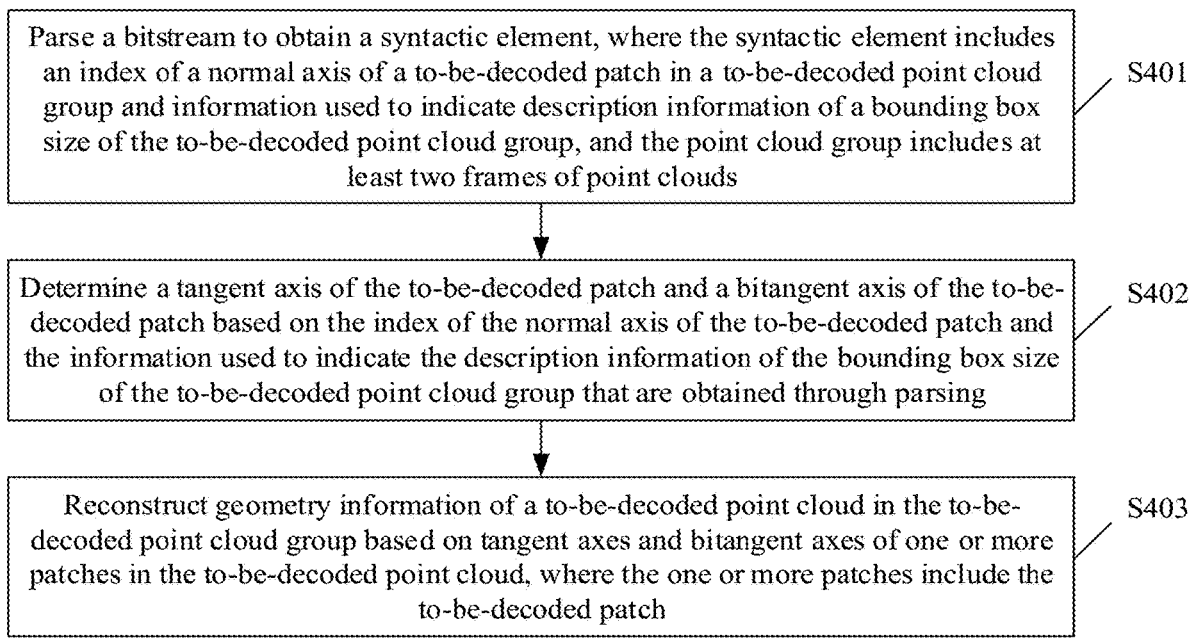
FIG. 14 is a schematic flowchart of another point cloud decoding method according to an embodiment of this application.

FIG. 14 is a schematic flowchart of a point cloud decoding method according to an embodiment of this application. For explanations of related content in this embodiment, refer to the foregoing descriptions. The method shown in FIG. 14 may include the following steps.

S401. Parse a bitstream to obtain a syntax element, where the syntax element includes an index of a normal axis of a to-be-decoded patch in a to-be-decoded point cloud group and information used to indicate description information of a bounding box size of the to-be-decoded point cloud group, and the point cloud group includes at least two frames of point clouds.

S402. Determine a tangent axis of the to-be-decoded patch and a bitangent axis of the to-be-decoded patch based on the index of the normal axis of the to-be-decoded patch and the information used to indicate the description information of the bounding box size of the to-be-decoded point cloud group that are obtained through parsing.

S403. Reconstruct geometry information of a to-be-decoded point cloud in the to-be-decoded point cloud group based on tangent axes and bitangent axes of one or more patches in the to-be-decoded point cloud, where the one or more patches include the to-be-decoded patch.

Optionally, the information used to indicate the description information of the bounding box size of the to-be-decoded point cloud group includes size information of a bounding box of the to-be-decoded point cloud group, an index of a coordinate axis on which a longest side of a bounding box of the to-be-decoded point cloud group is located, an index of a size relationship among side lengths of a bounding box of the to-be-decoded point cloud group, or the like.

It should be noted that, for explanations of related content, specific implementations of related steps, and the like in this embodiment, directly refer to the foregoing descriptions. Alternatively, the explanations and the implementations may be obtained through inference according to the method provided above. Details are not described herein.

The point cloud decoding method provided in this embodiment corresponds to the point cloud encoding method shown in FIG. 13. Therefore, for beneficial effects that can be achieved according to the point cloud decoding method, refer to the foregoing description. Details are not described herein again.

It should be noted that a method for determining a tangent axis and a bitangent axis of a patch in the embodiments of this application is included in the embodiments of the point cloud encoding method and the point cloud decoding method provided above. Therefore, a separate embodiment is not provided.

The foregoing mainly describes the solutions provided in the embodiments of this application from a perspective of the method. To implement the foregoing functions, the encoder and the decoder each include a corresponding hardware structure and/or software module for performing each function. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the encoder and the decoder may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, there may be another division manner.

Figure 15:
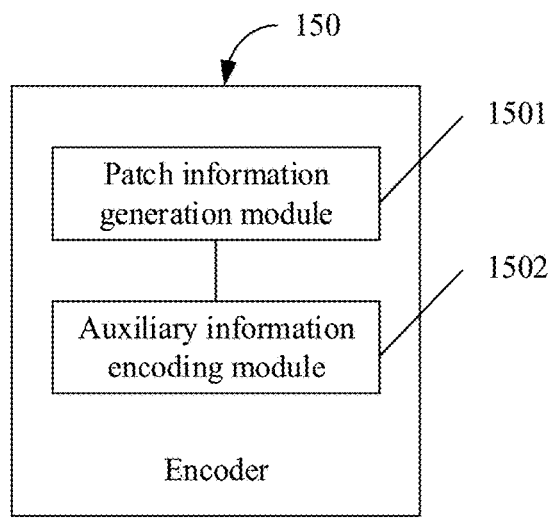
FIG. 15 is a schematic block diagram of an encoder according to an embodiment of this application.

FIG. 15 is a schematic block diagram of an encoder 150 according to an embodiment of this application. The encoder 150 may include a patch information generation module 1501 and an auxiliary information encoding module 1502. In an example, the patch information generation module 1501 may correspond to the patch information generation module 101 in FIG. 2, and the auxiliary information encoding module 1502 may correspond to the auxiliary information encoding module 108 in FIG. 2. Certainly, this application is not limited thereto.

The following describes a feasible implementation of performing encoding by the encoder 150 based on a point cloud.

In a feasible implementation, the patch information generation module 1501 is configured to obtain description information of a bounding box size of a to-be-encoded point cloud and a normal axis of a to-be-encoded patch in the to-be-encoded point cloud. The description information of the bounding box size of the to-be-encoded point cloud and the normal axis of the to-be-encoded patch are used to determine a tangent axis of the to-be-encoded patch and a bitangent axis of the to-be-encoded patch. The auxiliary information encoding module 1502 is configured to encode a syntax element into a bitstream, where the syntax element includes an index of the normal axis of the to-be-encoded patch and information used to indicate the description information of the bounding box size of the to-be-encoded point cloud, and the syntax element is used to indicate the tangent axis of the to-be-encoded patch and the bitangent axis of the to-be-encoded patch. For example, the patch information generation module 1501 may be configured to perform S101 in FIG. 9 and/or another step described in the embodiments of this application, and the auxiliary information encoding module 1502 may be configured to perform S103 in FIG. 9 and/or another step described in the embodiments of this application.

In a feasible implementation, the patch information generation module 1501 may be further configured to determine the tangent axis of the to-be-encoded patch and the bitangent axis of the to-be-encoded patch based on the description information of the bounding box size of the to-be-encoded point cloud and the normal axis of the to-be-encoded patch. For example, the patch information generation module 1501 may be configured to perform S102 in FIG. 9 and/or another step described in the embodiments of this application.

In a feasible implementation, the information used to indicate the description information of the bounding box size of the to-be-encoded point cloud includes size information of a bounding box of the to-be-encoded point cloud, an index of a coordinate axis on which a longest side of a bounding box of the to-be-encoded point cloud is located, or an index of a size relationship among side lengths of a bounding box of the to-be-encoded point cloud.

In a feasible implementation, the patch information generation module 1501 may be specifically configured to determine, based on a mapping relationship between a plurality of types of description information of bounding box sizes of point clouds and a plurality of tangent mode sets, a target tangent mode set corresponding to the description information of the bounding box size of the to-be-encoded point cloud, where each tangent mode set includes at least two tangent modes, and each tangent mode includes one tangent axis and one bitangent axis, and determine, based on a mapping relationship between a plurality of types of normal axes of a patch and a plurality of tangent modes in the target tangent mode set, a target tangent mode corresponding to the normal axis of the to-be-encoded patch, where a tangent axis included in the determined target tangent mode is the tangent axis of the to-be-encoded patch, and a bitangent axis included in the determined target tangent mode is the bitangent axis of the to-be-encoded patch.

In a feasible implementation, the patch information generation module 1501 may be specifically configured to determine, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-encoded point cloud and the normal axis of the to-be-encoded patch, where the determined target tangent axis is the tangent axis of the to-be-encoded patch, and the determined target bitangent axis is the bitangent axis of the to-be-encoded patch.

In a feasible implementation, the patch information generation module 1501 may be specifically configured to determine the tangent axis of the to-be-encoded patch and the bitangent axis of the to-be-encoded patch based on the description information of the bounding box size of the to-be-encoded point cloud and the normal axis of the to-be-encoded patch according to a projection rule for projecting the to-be-encoded point cloud, where the projection rule refers to distribution, on a two-dimensional plane, of a projected picture obtained by projecting a patch in the to-be-encoded point cloud onto the two-dimensional plane.

In a feasible implementation, the patch information generation module 1501 may be further configured to determine, according to a rate-distortion cost criterion, the projection rule for projecting the to-be-encoded point cloud. Optionally, the syntax element further includes information used to indicate the projection rule for projecting the to-be-encoded point cloud.

In a feasible implementation, the projection rule for projecting the to-be-encoded point cloud is preset.

In a feasible implementation, if a projection rule indicates vertical projection, the description information of the bounding box size of the to-be-encoded point cloud includes the size relationship among the side lengths of the bounding box of the to-be-encoded point cloud, and the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the bitangent axis of the to-be-encoded patch, and if a projection rule indicates vertical projection, the description information of the bounding box size of the to-be-encoded point cloud includes the size relationship among the side lengths of the bounding box of the to-be-encoded point cloud, and the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the bitangent axis of the to-be-encoded patch, and a coordinate axis on which a shortest side of the bounding box of the to-be-encoded point cloud is located is the tangent axis of the to-be-encoded patch.

Alternatively, if a projection rule indicates horizontal projection, the description information of the bounding box size of the to-be-encoded point cloud includes the size relationship among the side lengths of the bounding box of the to-be-encoded point cloud, and the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the tangent axis of the to-be-encoded patch, and if a projection rule indicates horizontal projection, the description information of the bounding box size of the to-be-encoded point cloud includes the size relationship among the side lengths of the bounding box of the to-be-encoded point cloud, and the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the tangent axis of the to-be-encoded patch, and a coordinate axis on which a shortest side of the bounding box of the to-be-encoded point cloud is located is the bitangent axis of the to-be-encoded patch.

The projection rule refers to distribution, on a two-dimensional plane, of a projected picture obtained by projecting a patch in the to-be-encoded point cloud onto the two-dimensional plane, and the two-dimensional plane is a plane on which the tangent axis of the to-be-encoded patch and the bitangent axis of the to-be-encoded patch are located.

In a feasible implementation, if a projection rule indicates vertical projection, the description information of the bounding box size of the to-be-encoded point cloud includes the coordinate axis on which the longest side of the bounding box of the to-be-encoded point cloud is located, and the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the bitangent axis of the to-be-encoded patch, and if a projection rule indicates vertical projection, the description information of the bounding box size of the to-be-encoded point cloud includes the coordinate axis on which the longest side of the bounding box of the to-be-encoded point cloud is located, and the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located and a coordinate axis on which a shortest side of the bounding box of the to-be-encoded point cloud is located is the bitangent axis of the to-be-encoded patch, and the other is the tangent axis of the to-be-encoded patch.

Alternatively, if a projection rule indicates horizontal projection, the description information of the bounding box size of the to-be-encoded point cloud includes the coordinate axis on which the longest side of the bounding box of the to-be-encoded point cloud is located, and the normal axis of the to-be-encoded patch is different from the coordinate axis on which the longest side of the bounding box of the to-be-encoded point cloud is located, the coordinate axis on which the longest side of the bounding box of the to-be-encoded point cloud is located is the tangent axis of the to-be-encoded patch, and if a projection rule indicates horizontal projection, the description information of the bounding box size of the to-be-encoded point cloud includes the coordinate axis on which the longest side of the bounding box of the to-be-encoded point cloud is located, and the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located and a coordinate axis on which a shortest side of the bounding box of the to-be-encoded point cloud is located is the tangent axis of the to-be-encoded patch, and the other is the bitangent axis of the to-be-encoded patch.

The projection rule refers to distribution, on a two-dimensional plane, of a projected picture obtained by projecting a patch in the to-be-encoded point cloud onto the two-dimensional plane, and the two-dimensional plane is a plane on which the tangent axis of the to-be-encoded patch and the bitangent axis of the to-be-encoded patch are located.

The following describes a feasible implementation of performing encoding by the encoder 150 based on a point cloud group.

In a feasible implementation, the patch information generation module 1501 is configured to obtain description information of a bounding box size of a to-be-encoded point cloud group and a normal axis of a to-be-encoded patch in the to-be-encoded point cloud group, where the to-be-encoded point cloud group includes at least two frames of point clouds, and determine a tangent axis of the to-be-encoded patch and a bitangent axis of the to-be-encoded patch based on the description information of the bounding box size of the to-be-encoded point cloud group and the normal axis of the to-be-encoded patch. The auxiliary information encoding module 1502 is configured to encode a syntax element into a bitstream, where the syntax element includes an index of the normal axis of the to-be-encoded patch and information used to indicate the description information of the bounding box size of the to-be-encoded point cloud group, and the syntax element is used to indicate the tangent axis of the to-be-encoded patch and the bitangent axis of the to-be-encoded patch. For example, the patch information generation module 1501 may be configured to perform S301 and S302 in FIG. 13 and/or another step described in the embodiments of this application, and the auxiliary information encoding module 1502 may be configured to perform S303 in FIG. 13 and/or another step described in the embodiments of this application.

In a feasible implementation, the patch information generation module 1501 may be specifically configured to use description information of a bounding box size of one frame of point cloud in the to-be-encoded point cloud group as the description information of the bounding box size of the to-be-encoded point cloud group, or use description information with a highest appearance frequency in description information of bounding box sizes of some or all point clouds in the to-be-encoded point cloud group as the description information of the bounding box size of the to-be-encoded point cloud group.

In a feasible implementation, the information used to indicate the description information of the bounding box size of the to-be-encoded point cloud group may include size information of a bounding box of one frame of point cloud in the to-be-encoded point cloud group, or size information with a highest appearance frequency in bounding box sizes of some or all point clouds in the to-be-encoded point cloud group, an index of a coordinate axis on which a longest side of a bounding box of one frame of point cloud in the to-be-encoded point cloud group is located, or an index of a coordinate axis with a highest appearance frequency in coordinate axes on which longest sides of bounding boxes of some or all point clouds in the to-be-encoded point cloud group are located, or an index of a size relationship among side lengths of a bounding box of one frame of point cloud in the to-be-encoded point cloud group, or an index of a size relationship with a highest appearance frequency in size relationships among side lengths of bounding boxes of some or all point clouds in the to-be-encoded point cloud group.

Optionally, all technical solutions obtained after frame level-based information in any feasible implementation in which the encoder 150 performs encoding based on a point cloud is replaced with GOF level-based information are applicable to a solution in which encoding is performed based on a point cloud group.

Figure 16:
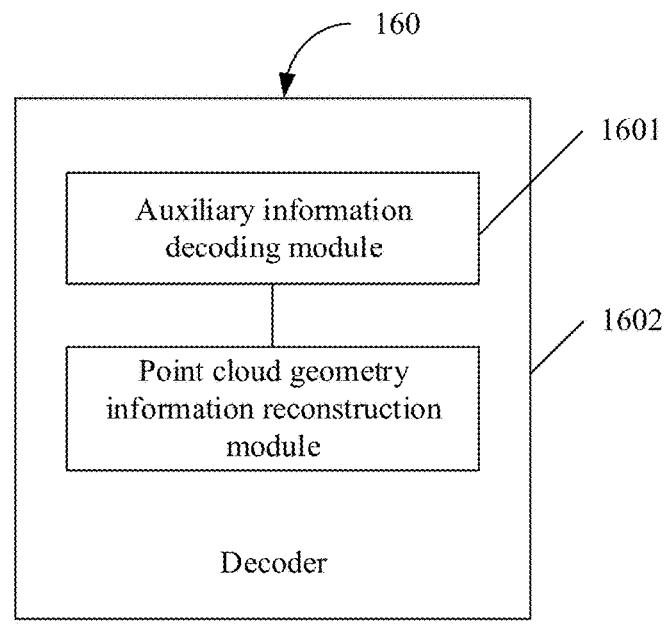
FIG. 16 is a schematic block diagram of a decoder according to an embodiment of this application.

FIG. 16 is a schematic block diagram of a decoder 160 according to an embodiment of this application. The decoder 160 may include an auxiliary information decoding module 1601 and a point cloud geometry information reconstruction module 1602. In an example, the auxiliary information decoding module 1601 may correspond to the auxiliary information decoding module 204 in FIG. 4, and the point cloud geometry information reconstruction module 1602 may correspond to the point cloud geometry information reconstruction module 205 in FIG. 4. Certainly, this application is not limited thereto.

The following describes a feasible implementation of performing decoding by the point cloud decoder 160 based on a point cloud.

In a feasible implementation, the auxiliary information decoding module 1601 is configured to parse a bitstream to obtain a syntax element, where the syntax element includes an index of a normal axis of a to-be-decoded patch in a to-be-decoded point cloud and information used to indicate description information of a bounding box size of the to-be-decoded point cloud, and determine a tangent axis of the to-be-decoded patch and a bitangent axis of the to-be-decoded patch based on the index of the normal axis of the to-be-decoded patch and the information used to indicate the description information of the bounding box size of the to-be-decoded point cloud that are obtained through parsing. The point cloud geometry information reconstruction module 1602 is configured to reconstruct geometry information of the to-be-decoded point cloud based on tangent axes and bitangent axes of one or more patches in the to-be-decoded point cloud, where the one or more patches include the to-be-decoded patch. For example, the auxiliary information decoding module 1601 may be configured to perform S201 and S202 in FIG. 12 and/or another step described in the embodiments of this application. The point cloud geometry information reconstruction module 1602 may be configured to perform S203 in FIG. 12 and/or another step described in the embodiments of this application.

In a feasible implementation, the information used to indicate the description information of the bounding box size of the to-be-decoded point cloud may include size information of a bounding box of the to-be-decoded point cloud, an index of a coordinate axis on which a longest side of a bounding box of the to-be-decoded point cloud is located, or an index of a size relationship among side lengths of a bounding box of the to-be-decoded point cloud.

In a feasible implementation, the auxiliary information decoding module 1601 may be specifically configured to determine, based on a mapping relationship between a plurality of types of description information of bounding box sizes of point clouds and a plurality of tangent mode sets, a target tangent mode set corresponding to the description information of the bounding box size of the to-be-decoded point cloud, where each tangent mode set includes at least two tangent modes, and each tangent mode includes one tangent axis and one bitangent axis, and determine, based on a mapping relationship between a plurality of types of normal axes of a patch and a plurality of tangent modes in the target tangent mode set, a target tangent mode corresponding to the normal axis of the to-be-decoded patch, where a tangent axis included in the determined target tangent mode is the tangent axis of the to-be-decoded patch, and a bitangent axis included in the determined target tangent mode is the bitangent axis of the to-be-decoded patch.

In a feasible implementation, the auxiliary information decoding module 1601 may be specifically configured to determine, based on a mapping relationship among a plurality of types of description information of bounding box sizes of point clouds, a plurality of types of normal axes of a patch, a plurality of types of tangent axes of the patch, and a plurality of types of bitangent axes of the patch, a target tangent axis and a target bitangent axis that correspond to both the description information of the bounding box size of the to-be-decoded point cloud and the normal axis of the to-be-decoded patch, where the determined target tangent axis is the tangent axis of the to-be-decoded patch, and the determined target bitangent axis is the bitangent axis of the to-be-decoded patch.

In a feasible implementation, the auxiliary information decoding module 1601 may be specifically configured to determine the tangent axis of the to-be-decoded patch and the bitangent axis of the to-be-decoded patch based on the description information of the bounding box size of the to-be-decoded point cloud and the normal axis of the to-be-decoded patch according to a projection rule for projecting the to-be-decoded point cloud, where the projection rule refers to distribution, on a two-dimensional plane, of a projected picture obtained by projecting a patch in the to-be-decoded point cloud onto the two-dimensional plane.

In a feasible implementation, the projection rule is preset.

In a feasible implementation, the syntax element further includes information used to indicate the projection rule.

In a feasible implementation, if a projection rule indicates vertical projection, the description information of the bounding box size of the to-be-decoded point cloud includes the size relationship among the side lengths of the bounding box of the to-be-decoded point cloud, and the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the bitangent axis of the to-be-decoded patch, and if a projection rule indicates vertical projection, the description information of the bounding box size of the to-be-decoded point cloud includes the size relationship among the side lengths of the bounding box of the to-be-decoded point cloud, and the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the bitangent axis of the to-be-decoded patch, and a coordinate axis on which a shortest side of the bounding box of the to-be-decoded point cloud is located is the tangent axis of the to-be-decoded patch.

Alternatively, if a projection rule indicates horizontal projection, the description information of the bounding box size of the to-be-decoded point cloud includes the size relationship among the side lengths of the bounding box of the to-be-decoded point cloud, and the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the tangent axis of the to-be-decoded patch, and if a projection rule indicates horizontal projection, the description information of the bounding box size of the to-be-decoded point cloud includes the size relationship among the side lengths of the bounding box of the to-be-decoded point cloud, and the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the tangent axis of the to-be-decoded patch, and a coordinate axis on which a shortest side of the bounding box of the to-be-decoded point cloud is located is the bitangent axis of the to-be-decoded patch.

The projection rule refers to distribution, on a two-dimensional plane, of a projected picture obtained by projecting a patch in the to-be-decoded point cloud onto the two-dimensional plane, and the two-dimensional plane is a plane on which the tangent axis of the to-be-decoded patch and the bitangent axis of the to-be-decoded patch are located.

In a feasible implementation, if a projection rule indicates vertical projection, the description information of the bounding box size of the to-be-decoded point cloud includes the coordinate axis on which the longest side of the bounding box of the to-be-decoded point cloud is located, and the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the bitangent axis of the to-be-decoded patch, and if a projection rule indicates vertical projection, the description information of the bounding box size of the to-be-decoded point cloud includes the coordinate axis on which the longest side of the bounding box of the to-be-decoded point cloud is located, and the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located and a coordinate axis on which a shortest side of the bounding box of the to-be-decoded point cloud is located is the bitangent axis of the to-be-decoded patch, and the other is the tangent axis of the to-be-decoded patch.

Alternatively, if a projection rule indicates horizontal projection, the description information of the bounding box size of the to-be-decoded point cloud includes the coordinate axis on which the longest side of the bounding box of the to-be-decoded point cloud is located, and the normal axis of the to-be-decoded patch is different from the coordinate axis on which the longest side of the bounding box of the to-be-decoded point cloud is located, the coordinate axis on which the longest side of the bounding box of the to-be-decoded point cloud is located is the tangent axis of the to-be-decoded patch, and if a projection rule indicates horizontal projection, the description information of the bounding box size of the to-be-decoded point cloud includes the coordinate axis on which the longest side of the bounding box of the to-be-decoded point cloud is located, and the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located and a coordinate axis on which a shortest side of the bounding box of the to-be-decoded point cloud is located is the tangent axis of the to-be-decoded patch, and the other is the bitangent axis of the to-be-decoded patch.

The projection rule refers to distribution, on a two-dimensional plane, of a projected picture obtained by projecting a patch in the to-be-decoded point cloud onto the two-dimensional plane, and the two-dimensional plane is a plane on which the tangent axis of the to-be-decoded patch and the bitangent axis of the to-be-decoded patch are located.

The following describes a feasible implementation of performing decoding by the decoder 150 based on a point cloud group.

In a feasible implementation, the auxiliary information decoding module 1601 is configured to parse a bitstream to obtain a syntax element, where the syntax element includes an index of a normal axis of a to-be-decoded patch in a to-be-decoded point cloud group and information used to indicate description information of a bounding box size of the to-be-decoded point cloud group, and the point cloud group includes at least two frames of point clouds, and determine a tangent axis of the to-be-decoded patch and a bitangent axis of the to-be-decoded patch based on the index of the normal axis of the to-be-decoded patch and the information used to indicate the description information of the bounding box size of the to-be-decoded point cloud group that are obtained through parsing. The point cloud geometry information reconstruction module 1602 is configured to reconstruct geometry information of a to-be-decoded point cloud in the to-be-decoded point cloud group based on tangent axes and bitangent axes of one or more patches in the to-be-decoded point cloud, where the one or more patches include the to-be-decoded patch. For example, the auxiliary information decoding module 1601 may be configured to perform S401 and S402 in FIG. 14 and/or another step described in the embodiments of this application. The point cloud geometry information reconstruction module 1602 may be configured to perform S403 in FIG. 14 and/or another step described in the embodiments of this application.

In a feasible implementation, the information used to indicate the description information of the bounding box size of the to-be-decoded point cloud group may include size information of a bounding box of the to-be-decoded point cloud group, an index of a coordinate axis on which a longest side of a bounding box of the to-be-decoded point cloud group is located, or an index of a size relationship among side lengths of a bounding box of the to-be-decoded point cloud group.

In a feasible implementation, the information used to indicate the description information of the bounding box size of the to-be-decoded point cloud group includes size information of a bounding box of one frame of point cloud in the to-be-decoded point cloud group, or size information with a highest appearance frequency in bounding box sizes of some or all point clouds in the to-be-decoded point cloud group, an index of a coordinate axis on which a longest side of a bounding box of one frame of point cloud in the to-be-decoded point cloud group is located, or an index of a coordinate axis with a highest appearance frequency in coordinate axes on which longest sides of bounding boxes of some or all point clouds in the to-be-decoded point cloud group are located, or an index of a size relationship among side lengths of a bounding box of one frame of point cloud in the to-be-decoded point cloud group, or an index of a size relationship with a highest appearance frequency in size relationships among side lengths of bounding boxes of some or all point clouds in the to-be-decoded point cloud group.

It may be understood that the modules in the encoder/decoder in the embodiments of this application are function bodies for implementing various execution steps included in the corresponding point cloud encoding/decoding method in this application, that is, function bodies that can completely implement steps in the corresponding point cloud encoding/decoding method in this application and extensions and variations of these steps. For details, refer to the foregoing description. For brevity, details are not described in this specification.

Figure 17:
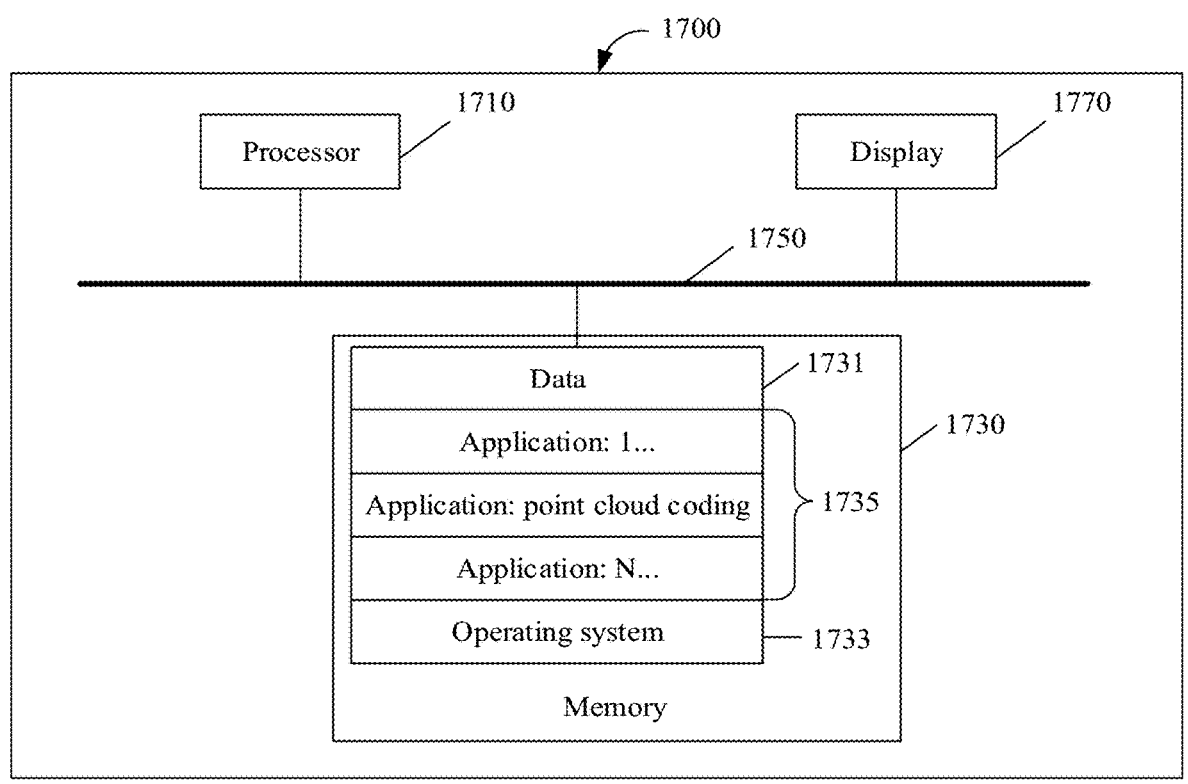
FIG. 17 is a schematic block diagram of an encoding device or a decoding device applicable to an embodiment of this application.

FIG. 17 is a schematic block diagram of an implementation of an encoding device or a decoding device (which are briefly referred to as a coding device 1700 or a point cloud coding device 1700) according to an embodiment of this application. The coding device 1700 may include a processor 1710, a memory 1730, and a bus system 1750. The processor 1710 is connected to the memory 1730 through the bus system 1750. The memory 1730 is configured to store an instruction. The processor 1710 is configured to execute the instruction stored in the memory 1730, to perform various point cloud encoding or decoding methods described in this application. To avoid repetition, details are not described herein again.

In this embodiment of this application, the processor 1710 may be a central processing unit (CPU), or the processor 1710 may be another general-purpose processor, a DSP, an ASIC, an FPGA, another programmable logic device, a discrete gate, a transistor logic device, a discrete hardware component, or the like. The general-purpose processor may be a microprocessor, or the processor may be any conventional processor or the like.

The memory 1730 may include a ROM device or a RAM device. Any other proper type of storage device may be alternatively used as the memory 1730. The memory 1730 may include code and data 1731 that are accessed by the processor 1710 through the bus 1750. The memory 1730 may further include an operating system 1733 and an application 1735. The application 1735 includes at least one program that enables the processor 1710 to perform the point cloud encoding or decoding method described in this application. For example, the application 1735 may include applications 1 to N, and further include a point cloud encoding or decoding application (briefly referred to as a point cloud coding application) for performing the point cloud encoding or decoding method described in this application.

The bus system 1750 may further include a power bus, a control bus, a status signal bus, and the like, in addition to a data bus. However, for clear description, various types of buses in the figure are marked as the bus system 1750.

Optionally, the coding device 1700 may further include one or more output devices, for example, a display 1770. In an example, the display 1770 may be a touch display that combines a display and a touch unit that can operationally sense touch input. The display 1770 may be connected to the processor 1710 through the bus 1750.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communications protocol). In this manner, the computer-readable medium may generally correspond to (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a DSL, or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disk and disc, as used herein, include a compact disc (CD), a laser disc, an optical disc, a DVD, and a BLU-RAY disc, where disks usually reproduce data magnetically, while discs reproduce data optically with lasers. Combinations of the foregoing items should also be included in the scope of the computer-readable media.

An instruction may be executed by one or more processors such as one or more DSP, general-purpose microprocessors, ASIC, FPGAs, or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements. In an example, various descriptive logical blocks, units, and modules in the encoder 100 and the decoder 200 can be understood as corresponding circuit devices or logic elements.

The technologies in this application may be implemented in various apparatuses or devices, including a wireless handset, an IC, or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An encoding apparatus comprising:
   a processor; and
   a memory coupled to the processor and configured to store instructions that, when executed by the processor, cause the encoding apparatus to be configured to:
   obtain description information of a bounding box size of a to-be-encoded point cloud;
   obtain a normal axis of a to-be-encoded patch in the to-be-encoded point cloud; and
   encode a syntax element into a bitstream,
   wherein the syntax element comprises an index of the normal axis and information indicating the description information of the bounding box size,
   wherein the syntax element indicates a first tangent axis of the to-be-encoded patch and a first bitangent axis of the to-be-encoded patch,
   wherein the to-be-encoded point cloud comprises one or more patches, and
   wherein the one or more patches comprise the to-be-encoded patch.

2. The encoding apparatus of claim 1, wherein the information comprises at least one of size information of a bounding box of the to-be-encoded point cloud, a first index of a coordinate axis of a longest side of the bounding box or a second index of a size relationship of a plurality of side lengths of the bounding box.

3. The encoding apparatus of claim 1, wherein the instructions further cause the encoding apparatus to be configured to determine, based on the description information and the normal axis, the first tangent axis of the to-be-encoded patch and the first bitangent axis of the to-be-encoded patch.

4. The encoding apparatus of claim 3, wherein the instructions further cause the encoding apparatus to be configured to:
  project a patch in the to-be-encoded point cloud onto a two-dimensional plane to obtain a projected picture, wherein the two-dimensional plane is a plane on which the first tangent axis and the first bitangent axis are located; and
  determine the first tangent axis and the first bitangent axis according to a projection rule based on the description information and the normal axis, wherein the projection rule refers to a distribution of the projected picture on the two-dimensional plane.

5. The encoding apparatus of claim 4, wherein the projection rule is a preset projection rule or the projection rule is based on a rate-distortion cost criterion.

6. The encoding apparatus of claim 5, wherein the syntax element further comprises information indicating the projection rule when the projection rule is based on the rate-distortion cost criterion.

7. The encoding apparatus of claim 3, wherein the instructions further cause the encoding apparatus to be configured to:
  determine a target tangent mode set corresponding to the description information based on a first mapping relationship between a plurality of types of description information of bounding box sizes of point clouds and a plurality of tangent mode sets, wherein each of the tangent mode sets comprises at least two tangent modes, and wherein each of the tangent modes comprises one tangent axis and one bitangent axis; and
  determine a target tangent mode corresponding to the normal axis based on a second mapping relationship between a plurality of types of normal axes of a patch and a plurality of tangent modes in the target tangent mode set, wherein a tangent axis of the target tangent mode is the first tangent axis, and wherein a third bitangent axis of the target tangent mode is the first bitangent axis.

8. The encoding apparatus of claim 3, wherein the instructions further cause the encoding apparatus to be configured to determine, based on a third mapping relationship among a plurality of types of description information of bounding box sizes of point clouds, a plurality of types of normal axes of a patch, a plurality of types of tangent axes of the patch, and a plurality of types of bitangent axes of the patch, wherein a target tangent axis and a target bitangent axis correspond to both the description information and the normal axis, wherein the target tangent axis is the first tangent axis, and wherein the target bitangent axis is the first bitangent axis.

9. The encoding apparatus of claim 1, wherein when a projection rule indicates a vertical projection, the description information of the bounding box size of the to-be-encoded point cloud comprises a size relationship among a plurality of side lengths of a bounding box of the to-be-encoded point cloud, the normal axis of the to-be-encoded patch is different from a coordinate axis on which a longest side of the bounding box of the to-be-encoded point cloud is located, and the coordinate axis on which the longest side of the bounding box of the to-be-encoded point cloud is located is the bitangent axis of the to-be-encoded patch, or the description information of the bounding box size of the to-be-encoded point cloud comprises the size relationship among the side lengths of the bounding box of the to-be-encoded point cloud, and the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the bitangent axis of the to-be-encoded patch, and a coordinate axis on which a shortest side of the bounding box of the to-be-encoded point cloud is located is the tangent axis of the to-be-encoded patch,
  wherein when the projection rule indicates a horizontal projection, the description information of the bounding box size of the to-be-encoded point cloud comprises the size relationship among the side lengths of the bounding box of the to-be-encoded point cloud, the normal axis of the to-be-encoded patch is different from the coordinate axis on which the longest side of the bounding box of the to-be-encoded point cloud is located, and the coordinate axis on which the longest side of the bounding box of the to-be-encoded point cloud is located is the tangent axis of the to-be-encoded patch, or the description information of the bounding box size of the to-be-encoded point cloud comprises the size relationship among the side lengths of the bounding box of the to-be-encoded point cloud, and the normal axis of the to-be-encoded patch is the same as the coordinate axis on which the longest side of the bounding box of the to-be-encoded point cloud is located, a coordinate axis on which a second longest side of the bounding box of the to-be-encoded point cloud is located is the tangent axis of the to-be-encoded patch, and a coordinate axis on which a shortest side of the bounding box of the to-be-encoded point cloud is located is the bitangent axis of the to-be-encoded patch, and
  wherein the projection rule refers to a distribution, on a two-dimensional plane, of a projected picture obtained by projecting a patch in the to-be-encoded point cloud onto the two-dimensional plane, and the two-dimensional plane is a plane on which the tangent axis of the to-be-encoded patch and the bitangent axis of the to-be-encoded patch are located.

10. The encoding apparatus of claim 1, wherein when a projection rule indicates a vertical projection, the description information of the bounding box size of the to-be-encoded point cloud comprises a coordinate axis on which a longest side of a bounding box of the to-be-encoded point cloud is located, and the normal axis of the to-be-encoded patch is different from the coordinate axis on which the longest side of the bounding box of the to-be-encoded point cloud is located, and the coordinate axis on which the longest side of the bounding box of the to-be-encoded point cloud is located is the bitangent axis of the to-be-encoded patch, or the description information of the bounding box size of the to-be-encoded point cloud comprises the coordinate axis on which the longest side of the bounding box of the to-be-encoded point cloud is located, and the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located or a coordinate axis on which a shortest side of the bounding box of the to-be-encoded point cloud is located is the bitangent axis of the to-be-encoded patch, and another of the coordinate axis on which the second longest side of the bounding box of the to-be-encoded point cloud is located the a coordinate axis on which the shortest side of the bounding box of the to-be-encoded point cloud is located is the tangent axis of the to-be-encoded patch, wherein when the projection rule indicates a horizontal projection, the description information of the bounding box size of the to-be-encoded point cloud comprises the coordinate axis on which the longest side of the bounding box of the to-be-encoded point cloud is located, and the normal axis of the to-be-encoded patch is different from the coordinate axis on which the longest side of the bounding box of the to-be-encoded point cloud is located, and the coordinate axis on which the longest side of the bounding box of the to-be-encoded point cloud is located is the tangent axis of the to-be-encoded patch, or the description information of the bounding box size of the to-be-encoded point cloud comprises the coordinate axis on which the longest side of the bounding box of the to-be-encoded point cloud is located, and the normal axis of the to-be-encoded patch is the same as the coordinate axis on which the longest side of the bounding box of the to-be-encoded point cloud is located, one of a coordinate axis on which a second longest side of the bounding box of the to-be-encoded point cloud is located or a coordinate axis on which a shortest side of the bounding box of the to-be-encoded point cloud is located is the tangent axis of the to-be-encoded patch, and another of the coordinate axis on which the second longest side of the bounding box of the to-be-encoded point cloud is located or the coordinate axis on which the shortest side of the bounding box of the to-be-encoded point cloud is located is the bitangent axis of the to-be-encoded patch, and wherein the projection rule refers to a distribution, on a two-dimensional plane, of a projected picture obtained by projecting a patch in the to-be-encoded point cloud onto the two-dimensional plane, and the two-dimensional plane is a plane on which the tangent axis of the to-be-encoded patch and the bitangent axis of the to-be-encoded patch are located.

11. A decoding apparatus comprising:
a processor; and
a memory coupled to the processor and configured to store instructions that, when executed by the processor, cause the decoding apparatus to be configured to:
parse a bitstream to obtain a syntax element, wherein the syntax element comprises an index of a normal axis of a to-be-decoded patch in a to-be-decoded point cloud and information indicating description information of a bounding box size of the to-be-decoded point cloud;
determine a first tangent axis of the to-be-decoded patch and a first bitangent axis of the to-be-decoded patch based on the index and the information indicating the description information of the bounding box size; and
reconstruct geometry information of the to-be-decoded point cloud based on a plurality of tangent axes and a plurality of bitangent axes of one or more patches in the to-be-decoded point cloud,
wherein the to-be-decoded point cloud comprises one or more patches, and wherein the one or more patches comprise the to-be-decoded patch.

12. The decoding apparatus of claim 11, wherein the information comprises one of the following size information of a bounding box of the to-be-decoded point cloud, a second index of a coordinate axis of a longest side of the bounding box, or a third index of a size relationship of a plurality of side lengths of the bounding box.

13. The decoding apparatus of claim 11, wherein the instructions further cause the decoding apparatus to be configured to:
project a patch in a to-be-encoded point cloud onto a two-dimensional plane to obtain a projected picture, wherein the two-dimensional plane is a plane on which the first tangent axis and the first bitangent axis are located; and
determine the first tangent axis and the first bitangent axis according to a projection rule based on the index of the normal axis and the information, wherein the projection rule refers to a distribution of the projected picture on the two-dimensional plane.

14. The decoding apparatus of claim 13, wherein the projection rule is a preset projection rule, or the syntax element further comprises information indicating the projection rule.

15. The decoding apparatus of claim 11, wherein the instructions further cause the decoding apparatus to be configured to:
determine a target tangent mode set corresponding to the description information based on a first mapping relationship between a plurality of types of description information of bounding box sizes of point clouds and a plurality of tangent mode sets, wherein each of the tangent mode sets comprises at least two tangent modes, and wherein each of the tangent modes comprises a second tangent axis and a second bitangent axis; and
determine a target tangent mode corresponding to the normal axis based on a second mapping relationship between a plurality of types of normal axes of a patch and a plurality of tangent modes in the target tangent mode set, wherein a third tangent axis of the target tangent mode is the first tangent axis, and wherein a third bitangent axis of the target tangent mode is the first bitangent axis.

16. The decoding apparatus of claim 11, wherein the instructions further cause the decoding apparatus to be configured to determine, based on a third mapping relationship among a plurality of types of description information of bounding box sizes of point clouds, a plurality of types of normal axes of a patch, a plurality of types of tangent axes of the patch, and a plurality of types of bitangent axes of the patch, wherein a target tangent axis and a target bitangent axis correspond to both the description information and the normal axis, wherein the target tangent axis is the first tangent axis, and wherein the target bitangent axis is the first bitangent axis.

17. The decoding apparatus of claim 11, wherein when a projection rule indicates a vertical projection, the description information of the bounding box size of the to-be-decoded point cloud comprises a size relationship among a plurality aside lengths of a bounding box of the to-be-decoded point cloud, the normal axis of the to-be-decoded patch is different from a coordinate axis on which a longest side of the bounding box of the to-be-decoded point cloud is located, and the coordinate axis on which the longest side of the bounding box of the to-be-decoded point cloud is located is the bitangent axis of the to-be-decoded patch, or the description information of the bounding box size of the to-be-decoded point cloud comprises the size relationship among the side lengths of the bounding box of the to-be-decoded point cloud, the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the bitangent axis of the to-be-decoded patch, and a coordinate axis on which a shortest side of the bounding box of the to-be-decoded point cloud is located is the tangent axis of the to-be-decoded patch, wherein when the projection rule indicates a horizontal projection, the description information of the bounding box size of the to-be-decoded point cloud comprises the size relationship among the side lengths of the bounding box of the to-be-decoded point cloud, the normal axis of the to-be-decoded patch is different from the coordinate axis on which the longest side of the bounding box of the to-be-decoded point cloud is located, and the coordinate axis on which the longest side of the bounding box of the to-be-decoded point cloud is located is the tangent axis of the to-be-decoded patch or the description information of the bounding box size of the to-be-decoded point cloud comprises the size relationship among the side lengths of the bounding box of the to-be-decoded point cloud, the normal axis of the to-be-decoded patch is the same as the coordinate axis on which the longest side of the bounding box of the to-be-decoded point cloud is located, a coordinate axis on which a second longest side of the bounding box of the to-be-decoded point cloud is located is the tangent axis of the to-be-decoded patch, and a coordinate axis on which a shortest side of the bounding box of the to-be-decoded point cloud is located is the bitangent axis of the to-be-decoded patch, and wherein the projection rule refers to a distribution, on a two-dimensional plane, of a projected picture obtained by projecting a patch in the to-be-decoded point cloud onto the two-dimensional plane, and the two-dimensional plane is a plane on which the tangent axis of the to-be-decoded patch and the bitangent axis of the to-be-decoded patch are located.

18. The decoding apparatus of claim 11, wherein when a projection rule indicates a vertical projection, the description information of the bounding box size of the to-be-decoded point cloud comprises a coordinate axis on which, longest side of a bounding box of the to-be-decoded point cloud is located, and the normal axis of the to-be-decoded patch is different from the coordinate axis on which the longest side of the bounding box of the to-be-decoded point cloud is located, and the coordinate axis on which the longest side of the bounding box of the to-be-decoded point cloud is located is the bitangent axis of the to-be-decoded patch, or the description information of the bounding box size of the to-be-decoded point cloud comprises the coordinate axis on which the longest side of the bounding box of the to-be-decoded point cloud is located, and the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located or, a coordinate axis on which a shortest side of the bounding box of the to-be-decoded point cloud is located is the bitangent axis of the to-be-decoded patch, and another of the coordinate axis on which the second longest side of the bounding box of the to-be-encoded point cloud is located the a coordinate axis on which the shortest side of the bounding box of the to-be-encoded point cloud is located is the tangent axis of the to-be-decoded patch, wherein when the projection rule indicates a horizontal projection, the description information of the bounding box size of the to-be-decoded point cloud comprises the coordinate axis on which the longest side of the bounding box of the to-be-decoded point cloud is located, and the normal axis of the to-be-decoded patch is different from the coordinate axis on which the longest side of the bounding box of the to-be-decoded point cloud is located, and the coordinate axis on which the longest side of the bounding box of the to-be-decoded point cloud is located is the tangent axis of the to-be-decoded patch, or the description information of the bounding box size of the to-be-decoded point cloud comprises the coordinate axis on which the longest side of the bounding box of the to-be-decoded point cloud is located, and the normal axis of the to-be-decoded patch is the same as the coordinate axis on which the longest side of the bounding box of the to-be-decoded point cloud is located, one of a coordinate axis on which a second longest side of the bounding box of the to-be-decoded point cloud is located and a coordinate axis on which a shortest side of the bounding box of the to-be-decoded point cloud is located is the tangent axis of the to-be-decoded patch, and another of the coordinate axis on which the second longest side of the bounding box of the to-be-encoded point cloud is located or the coordinate axis on which the shortest side of the bounding box of the to-be-encoded point cloud is located is the bitangent axis of the to-be-decoded patch, and wherein the projection rule refers to a distribution, on a two-dimensional plane, of a projected picture obtained by projecting a patch in the to-be-decoded point cloud onto the two-dimensional plane, and the two-dimensional plane is a plane on which the tangent axis of the to-be-decoded patch and the bitangent axis of the to-be-decoded patch are located.

19. A computer program product comprising computer-executable instructions stored on a non-transitory computer-readable medium that, when executed by a processor, cause an encoding apparatus to:

obtain description information of a bounding box size of a to-be-encoded point cloud;

obtain a normal axis of a to-be-encoded patch in the to-be-encoded point cloud; and encode a syntax element into a bitstream, wherein the syntax element comprises an index of the normal axis and information indicating the description information of the bounding box size, and wherein the syntax element indicates a tangent axis of the to-be-encoded patch and a bitangent axis of the to-be-encoded patch, wherein the to-be-encoded point cloud comprises one or more patches, and wherein the one or more patches comprise the to-be-encoded patch.

20. A computer program product comprising computer-executable instructions stored on a non-transitory computer-readable medium that, when executed by a processor, cause a decoding apparatus to:

parse a bitstream to obtain a syntax element, wherein the syntax element comprises an index of a normal axis of a to-be-decoded patch in a to-be-decoded point cloud and information indicating description information of a bounding box size of the to-be-decoded point cloud;

determine a tangent axis of the to-be-decoded patch and a bitangent axis of the to-be-decoded patch based on the index and the information indicating description information of the bounding box size; and reconstruct geometry information of the to-be-decoded point cloud based on a plurality of tangent axes and a plurality of bitangent axes of one or more patches in the to-be-decoded point cloud, wherein the to-be-decoded point cloud comprises one or more patches, and wherein the one or more patches comprise the to-be-decoded patch.

21. The encoding apparatus of claim 1, wherein the bounding box size of the to-be-encoded point cloud depends on bounding box sizes of patches in the to-be-encoded point cloud, or wherein the description information of the bounding box size describes the one or more patches in the to-be-encoded point cloud.

22. The decoding apparatus of claim 11, wherein the bounding box size of the to-be-decoded point cloud depends on bounding box sizes of patches in the to-be-decoded point cloud, or wherein the description information of the bounding box size describes the one or more patches in the to-be-decoded point cloud.

23. The computer program product of claim 19, wherein the bounding box size of the to-be-encoded point cloud depends on bounding box sizes of patches in the to-be-encoded point cloud, or wherein the description information of the bounding box size describes the one or more patches in the to-be-encoded point cloud.

24. The computer program product of claim 20, wherein the bounding box size of the to-be-decoded point cloud depends on bounding box sizes of patches in the to-be-decoded point cloud, or wherein the description information of the bounding box size describes the one or more patches in the to-be-decoded point cloud.

\* \* \* \* \*

UNITED STATES PATENT AND TRADEMARK OFFICE
CERTIFICATE OF CORRECTION

PATENT NO. : 11,328,450 B2
APPLICATION NO. : 17/136915
DATED : May 10, 2022
INVENTOR(S) : Dejun Zhang, Bo Liu and Vladyslav Zakharchenko It is certified that error appears in the above-identified patent and that said Letters Patent is hereby corrected as shown below:

In the Claims

Claim 18, Column 67, Line 48: "on which, longest" should read "on which a longest"

Claim 18, Column 67, Line 64: "located or, a coordinate" should read "located or a coordinate"

Signed and Sealed this
Twenty-eighth Day of June, 2022

Katherine Kelly Vidal
*Director of the United States Patent and Trademark Office*